United States Patent
Coulonvaux et al.

(10) Patent No.: US 8,784,523 B2
(45) Date of Patent: *Jul. 22, 2014

(54) AIR CLEANER REPLACEABLE FILTER CARTRIDGES; AND, METHODS

(75) Inventors: Paul Coulonvaux, Brussels (BE); Johnny Craessaerts, Huldenberg (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,307

(22) Filed: Sep. 14, 2012

(65) Prior Publication Data

US 2013/0239528 A1 Sep. 19, 2013

Related U.S. Application Data

(63) Continuation of application No. 12/311,594, filed as application No. PCT/US2007/021402 on Oct. 8, 2007, now Pat. No. 8,273,143.

(60) Provisional application No. 60/849,906, filed on Oct. 6, 2006, provisional application No. 60/963,068, filed on Aug. 1, 2007.

(51) Int. Cl.
   *B01D 45/00* (2006.01)
(52) U.S. Cl.
   USPC .................. 55/344; 55/482; 55/495; 55/498; 55/350.1; 55/502; 55/385.3; 55/503; 55/504; 55/521; 55/459.1
(58) Field of Classification Search
   CPC ............ B01D 46/0005; B01D 46/521; B01D 46/2411
   USPC ............ 55/344, 482, 495, 498, 350.1, 385.3, 55/502, 503, 504, 521, 510, 459.1
   See application file for complete search history.

(56) References Cited

U.S. PATENT DOCUMENTS

| 2,771,156 A | 11/1956 | Kasten et al. |
| 3,002,870 A | 10/1961 | Belgarde et al. |

(Continued)

FOREIGN PATENT DOCUMENTS

| BE | 1011567 A3 | 11/1989 |
| DE | 195 19 438 | 11/1996 |

(Continued)

OTHER PUBLICATIONS

International Search Report and Written Opinion corresponding to PCT/US2007/021402 mailed Jun. 6, 2008.

(Continued)

*Primary Examiner* — Jason M Greene
*Assistant Examiner* — Dung H Bui
(74) *Attorney, Agent, or Firm* — Merchant & Gould P.C.

(57) ABSTRACT

An air cleaner assembly, a main filter element, a safety element, combinations and methods for servicing an air cleaner assembly are provided according to the present invention. The air cleaner assembly includes an air cleaner housing and a main filter element. The air cleaner housing includes a safety liner that supports the main filter element, and can be configured to help reduce the tendency of the main filter element to rotate during use of the air cleaner assembly. A safety element having two open ends, for use with such an assembly is described.

7 Claims, 24 Drawing Sheets

(56) References Cited

U.S. PATENT DOCUMENTS

| | | |
|---|---|---|
| 3,048,959 A | 8/1962 | Lowther |
| 3,078,650 A | 2/1963 | Anderson et al. |
| 3,160,488 A | 12/1964 | Wilber |
| 3,169,844 A | 2/1965 | Young |
| 3,290,870 A | 12/1966 | Jensen |
| 3,342,021 A | 9/1967 | Yelinek et al. |
| 3,342,335 A | 9/1967 | Gamundi et al. |
| 3,354,012 A | 11/1967 | Forman et al. |
| 3,357,163 A | 12/1967 | Burger et al. |
| 3,413,780 A | 12/1968 | Amlott et al. |
| 3,423,909 A | 1/1969 | Bennett et al. |
| 3,452,519 A | 7/1969 | Bianchetta |
| 3,488,928 A | 1/1970 | Tarala |
| 3,584,439 A | 6/1971 | Gronholz |
| 3,672,130 A | 6/1972 | Sullivan et al. |
| 3,710,560 A | 1/1973 | Maddocks |
| 3,716,436 A | 2/1973 | Pall et al. |
| 4,006,000 A | 2/1977 | Tortorici et al. |
| 4,062,781 A | 12/1977 | Strauss et al. |
| 4,128,251 A | 12/1978 | Gaither et al. |
| 4,135,899 A | 1/1979 | Gauer |
| 4,159,197 A | 6/1979 | Schuler et al. |
| 4,211,543 A | 7/1980 | Tokar et al. |
| 4,222,755 A | 9/1980 | Grotto |
| 4,227,898 A | 10/1980 | Kamekawa et al. |
| 4,235,611 A | 11/1980 | Brownell |
| 4,303,426 A | 12/1981 | Battis |
| 4,349,363 A | 9/1982 | Patel et al. |
| 4,350,509 A | 9/1982 | Alseth et al. |
| 4,402,830 A | 9/1983 | Pall |
| 4,488,889 A | 12/1984 | McCarroll |
| 4,491,460 A | 1/1985 | Tokar |
| 4,498,915 A | 2/1985 | Witchell |
| 4,588,426 A | 5/1986 | Virgille et al. |
| 4,609,465 A | 9/1986 | Miller |
| 4,720,292 A | 1/1988 | Engel et al. |
| 4,728,423 A | 3/1988 | Kuwajima |
| 4,764,191 A | 8/1988 | Morelli |
| 4,801,383 A | 1/1989 | Hoffmann et al. |
| 4,818,261 A | 4/1989 | Beckon |
| 4,838,901 A | 6/1989 | Schmidt et al. |
| 4,950,317 A | 8/1990 | Dottermans |
| 5,045,192 A | 9/1991 | Terhune |
| 5,064,458 A | 11/1991 | Machado |
| 5,071,456 A | 12/1991 | Binder et al. |
| 5,082,476 A | 1/1992 | Kahlbaugh et al. |
| 5,112,417 A | 5/1992 | Sayles |
| 5,116,499 A | 5/1992 | Deibel |
| 5,118,417 A | 6/1992 | Deibel |
| 5,120,337 A | 6/1992 | Benzler et al. |
| 5,137,557 A | 8/1992 | Behrendt et al. |
| 5,160,519 A | 11/1992 | Svensson et al. |
| 5,167,683 A | 12/1992 | Behrendt et al. |
| 5,211,846 A | 5/1993 | Kott et al. |
| 5,238,476 A | 8/1993 | Svensson et al. |
| 5,250,179 A | 10/1993 | Spearman |
| 5,277,157 A | 1/1994 | Teich |
| 5,290,445 A | 3/1994 | Buttery |
| 5,431,168 A | 7/1995 | Webster, Jr. |
| 5,442,721 A | 8/1995 | Kalada et al. |
| 5,445,241 A | 8/1995 | Nakamura et al. |
| 5,484,466 A | 1/1996 | Brown et al. |
| 5,545,241 A | 8/1996 | Vanderauwera et al. |
| 5,547,480 A | 8/1996 | Coulonvaux |
| 5,556,440 A | 9/1996 | Mullins et al. |
| 5,601,717 A | 2/1997 | Villette et al. |
| 5,605,555 A | 2/1997 | Patel et al. |
| 5,605,625 A | 2/1997 | Mills |
| 5,613,992 A | 3/1997 | Engel |
| 5,632,791 A | 5/1997 | Oussoren et al. |
| 5,685,985 A | 11/1997 | Brown et al. |
| 5,690,712 A | 11/1997 | Engel |
| 5,700,304 A | 12/1997 | Foo |
| 5,720,788 A | 2/1998 | Puckett et al. |
| 5,720,790 A | 2/1998 | Kometani et al. |
| 5,730,769 A | 3/1998 | Dungs et al. |
| 5,736,040 A | 4/1998 | Duerrstein et al. |
| 5,741,421 A | 4/1998 | Erdmannsdoerfer et al. |
| 5,753,117 A | 5/1998 | Jiang |
| 5,755,842 A | 5/1998 | Patel et al. |
| 5,755,844 A | 5/1998 | Arai et al. |
| 5,775,842 A | 7/1998 | Osborne |
| 5,800,581 A | 9/1998 | Gielink et al. |
| D401,306 S | 11/1998 | Ward |
| 5,865,863 A | 2/1999 | DeSousa et al. |
| 5,882,367 A | 3/1999 | Morgan et al. |
| 5,893,937 A | 4/1999 | Moessinger |
| 5,897,676 A | 4/1999 | Engel et al. |
| 5,916,435 A | 6/1999 | Spearman et al. |
| 5,919,279 A | 7/1999 | Merritt et al. |
| 5,921,982 A | 7/1999 | Lesh et al. |
| 5,938,804 A | 8/1999 | Engel et al. |
| D414,544 S | 9/1999 | Ward et al. |
| 5,951,729 A | 9/1999 | Ernst et al. |
| 5,972,063 A | 10/1999 | Dudrey et al. |
| D416,308 S | 11/1999 | Ward et al. |
| 5,984,109 A | 11/1999 | Kanwar et al. |
| 6,004,366 A | 12/1999 | Engel et al. |
| 6,039,778 A | 3/2000 | Coulonvaux |
| 6,051,042 A | 4/2000 | Coulonvaux |
| 6,090,177 A | 7/2000 | Moessinger et al. |
| 6,099,606 A | 8/2000 | Miller et al. |
| 6,149,700 A | 11/2000 | Morgan et al. |
| 6,152,979 A | 11/2000 | Cappuyns |
| 6,171,275 B1 | 1/2001 | Webster, Jr. |
| 6,258,145 B1 | 7/2001 | Engel et al. |
| 6,261,334 B1 | 7/2001 | Morgan et al. |
| 6,290,739 B1 | 9/2001 | Gieseke et al. |
| 6,322,602 B2 | 11/2001 | Engel et al. |
| 6,383,244 B1 | 5/2002 | Wake et al. |
| 6,398,832 B2 | 6/2002 | Morgan et al. |
| 6,402,798 B1 | 6/2002 | Kallsen et al. |
| 6,413,289 B2 | 7/2002 | Engel et al. |
| 6,416,561 B1 | 7/2002 | Kallsen et al. |
| 6,419,718 B1 | 7/2002 | Klug et al. |
| 6,436,162 B1 | 8/2002 | Wake et al. |
| 6,447,567 B1 | 9/2002 | Ehrenberg |
| 6,485,535 B1 | 11/2002 | Linnersten et al. |
| D467,654 S | 12/2002 | Klug et al. |
| 6,521,009 B2 | 2/2003 | Engel et al. |
| D471,623 S | 3/2003 | Gieseke et al. |
| 6,540,806 B2 | 4/2003 | Reinhold |
| D475,129 S | 5/2003 | Ward et al. |
| 6,558,453 B2 | 5/2003 | Sepke et al. |
| 6,572,667 B1 | 6/2003 | Greif et al. |
| D477,659 S | 7/2003 | Gieseke et al. |
| 6,585,838 B1 | 7/2003 | Mullins et al. |
| 6,599,342 B2 | 7/2003 | Andress et al. |
| 6,602,308 B1 | 8/2003 | Carle et al. |
| D481,101 S | 10/2003 | Boehrs |
| 6,652,614 B2 | 11/2003 | Gieseke et al. |
| D485,339 S | 1/2004 | Klug et al. |
| 6,736,874 B2 | 5/2004 | Rieger et al. |
| 6,837,920 B2 | 1/2005 | Gieseke et al. |
| D513,314 S | 12/2005 | Iddings et al. |
| 6,986,805 B2 | 1/2006 | Gieseke et al. |
| 7,070,642 B2 | 7/2006 | Scott et al. |
| 7,291,198 B2 | 11/2007 | Gieseke et al. |
| 7,374,595 B2 * | 5/2008 | Gierer .......................... 55/498 |
| 7,413,588 B2 | 8/2008 | Holzmann et al. |
| 7,524,349 B2 | 4/2009 | Schrage et al. |
| 7,537,631 B2 | 5/2009 | Scott et al. |
| 7,572,310 B2 | 8/2009 | Gieseke et al. |
| 7,625,419 B2 | 12/2009 | Nelson et al. |
| 7,662,203 B2 | 2/2010 | Scott et al. |
| 7,981,186 B2 | 7/2011 | Schrage et al. |
| 7,988,757 B2 | 8/2011 | Scott et al. |
| 8,038,756 B2 | 10/2011 | Iddings et al. |
| 8,062,399 B2 | 11/2011 | Nelson et al. |
| 8,066,791 B2 | 11/2011 | Baseotto et al. |
| 8,216,335 B2 | 7/2012 | Scott et al. |
| 8,292,984 B2 | 10/2012 | Baseotto et al. |
| 8,328,897 B2 | 12/2012 | Nelson et al. |
| 8,545,588 B2 | 10/2013 | Iddings et al. |

(56) References Cited

U.S. PATENT DOCUMENTS

| | | |
|---|---|---|
| 2002/0014058 A1 | 2/2002 | Engel et al. |
| 2003/0051455 A1 | 3/2003 | Gieseke et al. |
| 2003/0226793 A1* | 12/2003 | Merritt et al. ............... 210/206 |
| 2004/0134171 A1 | 7/2004 | Scott et al. |
| 2004/0261383 A1 | 12/2004 | Schaerlund et al. |
| 2006/0086075 A1 | 4/2006 | Scott et al. |
| 2008/0190082 A1 | 8/2008 | Scott et al. |
| 2009/0049814 A1 | 2/2009 | Baseotto et al. |
| 2009/0094951 A1 | 4/2009 | Baseotto et al. |
| 2009/0100813 A1 | 4/2009 | Baseotto et al. |
| 2009/0217632 A1 | 9/2009 | Coulonvaux et al. |
| 2010/0146920 A1 | 6/2010 | Iddings et al. |
| 2011/0308212 A1 | 12/2011 | Ruhland et al. |

FOREIGN PATENT DOCUMENTS

| | | |
|---|---|---|
| DE | 198 49 089 A1 | 4/2000 |
| EP | 0 230 991 A2 | 8/1987 |
| EP | 0 329 659 B1 | 8/1989 |
| EP | 0 480 991 B1 | 4/1992 |
| EP | 0 562 502 | 9/1993 |
| EP | 1 128 891 | 2/2003 |
| EP | 1 123 460 B1 | 8/2003 |
| EP | 1 174 171 B1 | 8/2004 |
| EP | 1 357 997 B1 | 9/2006 |
| EP | 1 754 525 | 2/2007 |
| FR | 2 665 217 | 1/1992 |
| GB | 1 125 335 | 4/1919 |
| GB | 1 124 735 | 8/1968 |
| GB | 1 499 922 | 2/1978 |
| GB | 1 511 904 | 5/1978 |
| GB | 2 110 110 | 6/1983 |
| GB | 2119674 | 11/1983 |
| GB | 2 163 368 | 2/1986 |
| SU | 868082 | 9/1981 |
| WO | WO 89/01818 | 3/1989 |
| WO | WO 91/00425 | 1/1991 |
| WO | WO 98/11977 | 3/1998 |
| WO | WO 99/42719 | 8/1999 |
| WO | WO 00/ 23166 | 4/2000 |
| WO | WO 01/91884 | 12/2001 |
| WO | WO 02/45819 | 6/2002 |
| WO | WO 02/078816 A1 | 10/2002 |
| WO | WO 2004/039476 | 5/2004 |
| WO | WO 2005/092475 | 10/2005 |
| WO | WO 2006/026241 | 3/2006 |

OTHER PUBLICATIONS

Exhibit 1, Claims corresponding to U.S. Appl. No. 13/656,936 dated Oct. 22, 2012.
Exhibit 2, Claims corresponding to U.S. Appl. No. 13/274,474 dated Jul. 26, 2012.
Exhibit 3, Claims corresponding to U.S. Appl. No. 13/195,382 dated Dec. 10, 2012.
Exhibit 4, Claims corresponding to U.S. Appl. No. 13/544,118 dated Jul. 9, 2012.
Exhibit 5, Claims corresponding to U.S. Appl. No. 12/450,642 dated Oct. 17, 2012.
Exhibit 6, Claims corresponding to U.S. Appl. No. 13/305,230 dated Jan. 29, 2013.
Exhibit A, Pending claims of U.S. Appl. No. 14/040,966 dated Jan. 16, 2014.
Exhibit B, Pending claims of U.S. Appl. No. 13/914,042 dated Jan. 16, 2014.
Exhibit C, Pending claims of U.S. Appl. No. 13/793,006 dated Jan. 16, 2014.
Exhibit D, Pending claims of U.S. Appl. No. 13/936,525 dated Jan. 16, 2014.

* cited by examiner

AIR CLEANER REPLACEABLE FILTER CARTRIDGES; AND, METHODS

CROSS REFERENCE RELATED APPLICATION

This application is a continuation application of Ser. No. 12/311,594 filed Apr. 3, 2009, which has now issued as U.S. Pat. No. 8,273,143, which was a US filing of PCT application PCT/US2007/021402, filed Oct. 8, 2007, which has now issued as U.S. Pat. No. 8,273,143; the PCT application claiming priority to U.S. Ser. No. 60/849,906, filed Oct. 6, 2006 and U.S. Ser. No. 60/963,068, filed Aug. 1, 2007. The complete disclosure of U.S. Ser. No. 12/311,594; PCT/US2007/021402; U.S. Ser. Nos. 60/849,906; and, 60/963,068 are incorporated herein by reference. A claim of priority is made to each of U.S. Ser. No. 12/311,594; PCT/US2007/021402; U.S. Ser. Nos. 60/849,906; and, 60/963,068 is made to the extent appropriate.

FIELD OF THE DISCLOSURE

The present disclosure concerns air cleaners with removable and replaceable (i.e., serviceable) filter cartridges. Methods of servicing are also provided.

BACKGROUND

Air filtering is used in a variety of arrangements. A typical application is as an air cleaner for intake air to internal combustion engines. After a period of use, filter media within the cleaner requires servicing, either through cleaning or complete replacement. Typically, for an air cleaner used within internal combustion engines such as on a vehicle, filter media is contained in a removable or replaceable (for example, serviceable) component, element or cartridge. Examples are shown in U.S. Pat. Nos. 4,211,543; 4,135,899; 3,672,130; 5,445,241; 5,700,304; 6,051,042; 6,039,778; 5,547,480; 5,755,842; and 5,800,581; and PCT Publication WO 89/01818 and WO 06/026241; the complete disclosures of all these references being incorporated herein by reference.

Improvements in filter arrangements relating to assembly and use, are desirable.

SUMMARY

An air cleaner assembly, a main filter element, and a method for servicing an air cleaner assembly are provided according to the present invention. The air cleaner assembly includes an air cleaner housing and a main filter element. The air cleaner housing includes a safety liner having a closed end cap that supports the main filter element.

DETAILED DESCRIPTION

Figure 1:
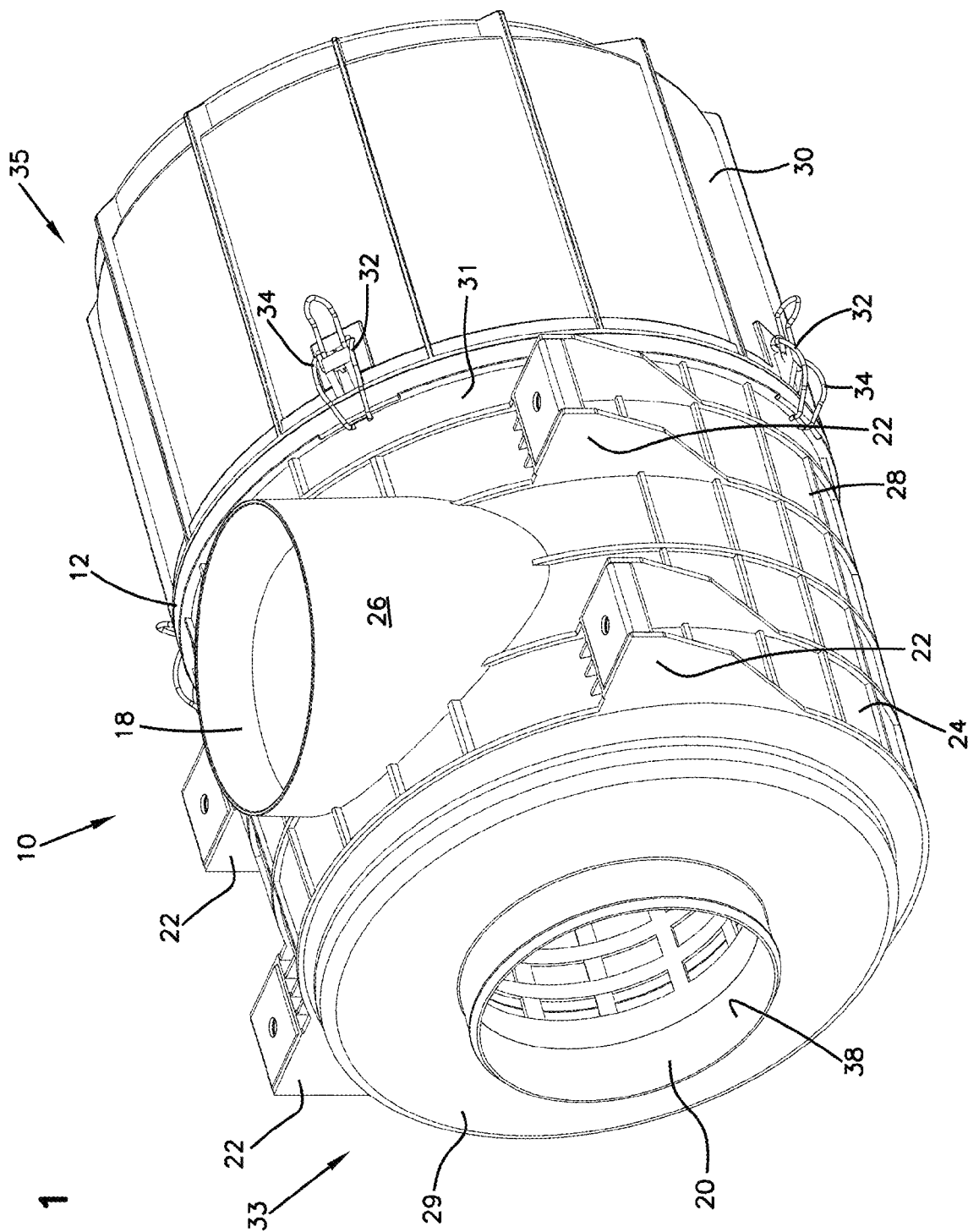
FIG. 1 is a side, perspective view of a main cleaner assembly according to the present disclosure.
Figure 11:
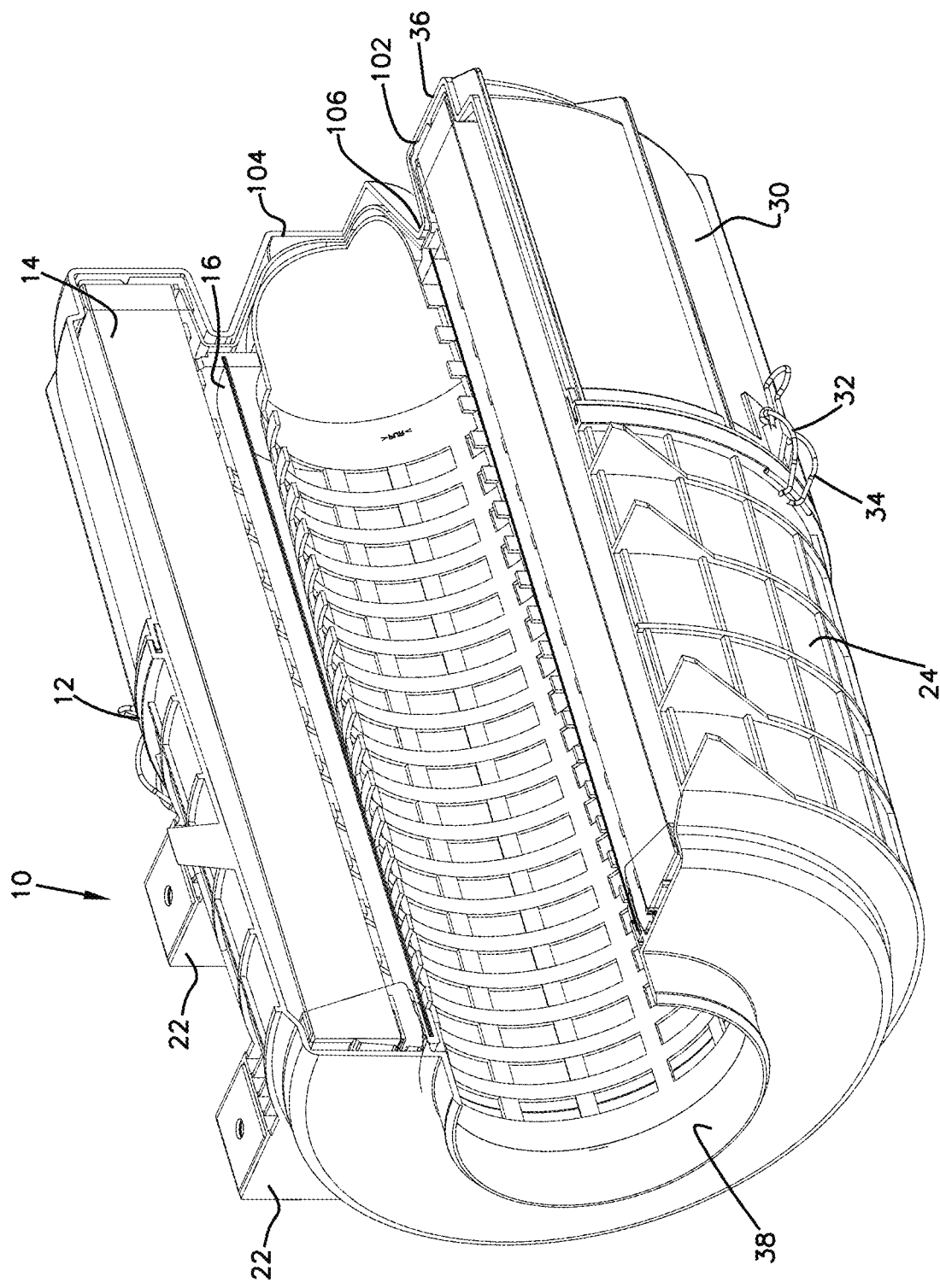
FIG. 11 is a cutaway, perspective view of the assembly of FIG. 1.
Figure 12:
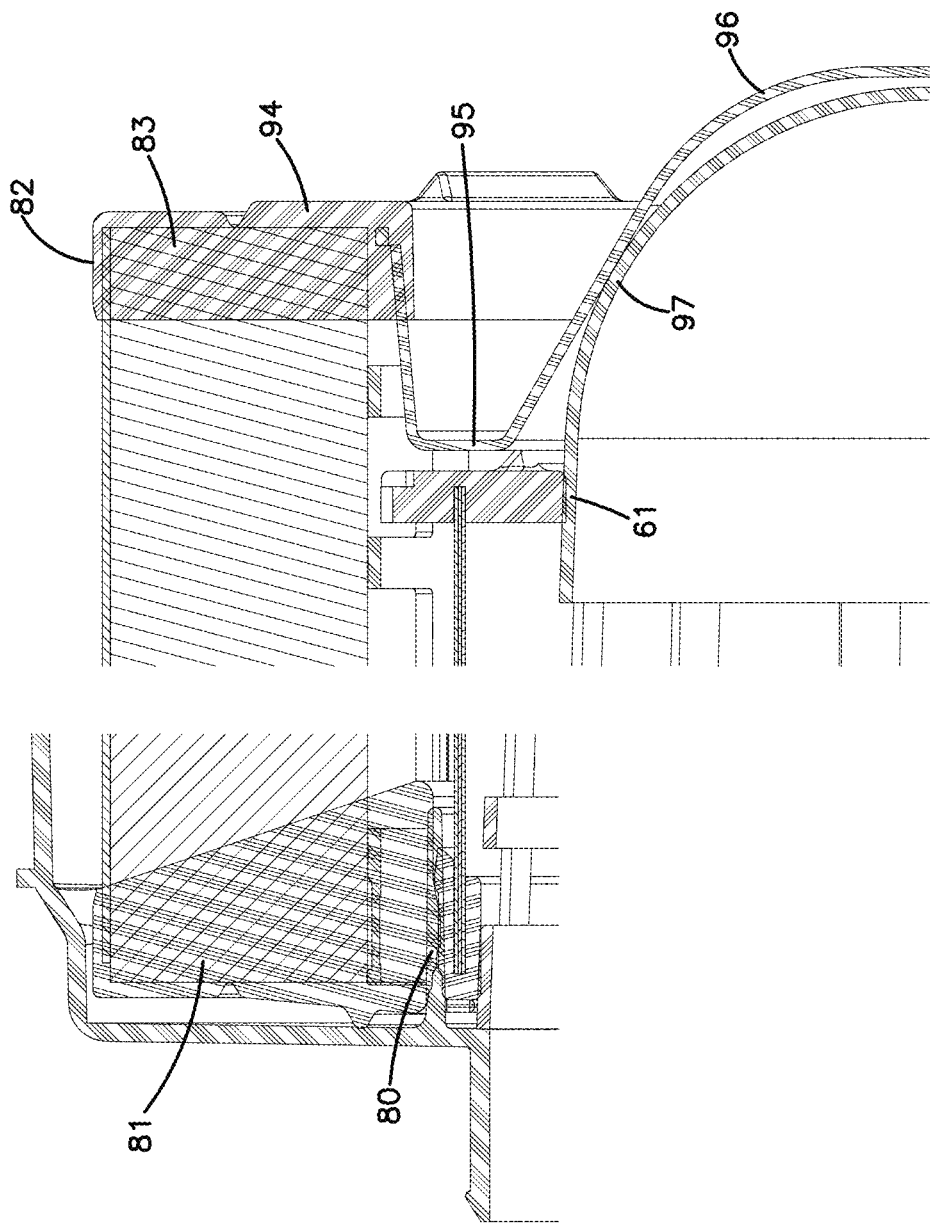
FIG. 12 is a partial, sectional view of the assembly of FIG. 11 without the access cover.
Figure 13:
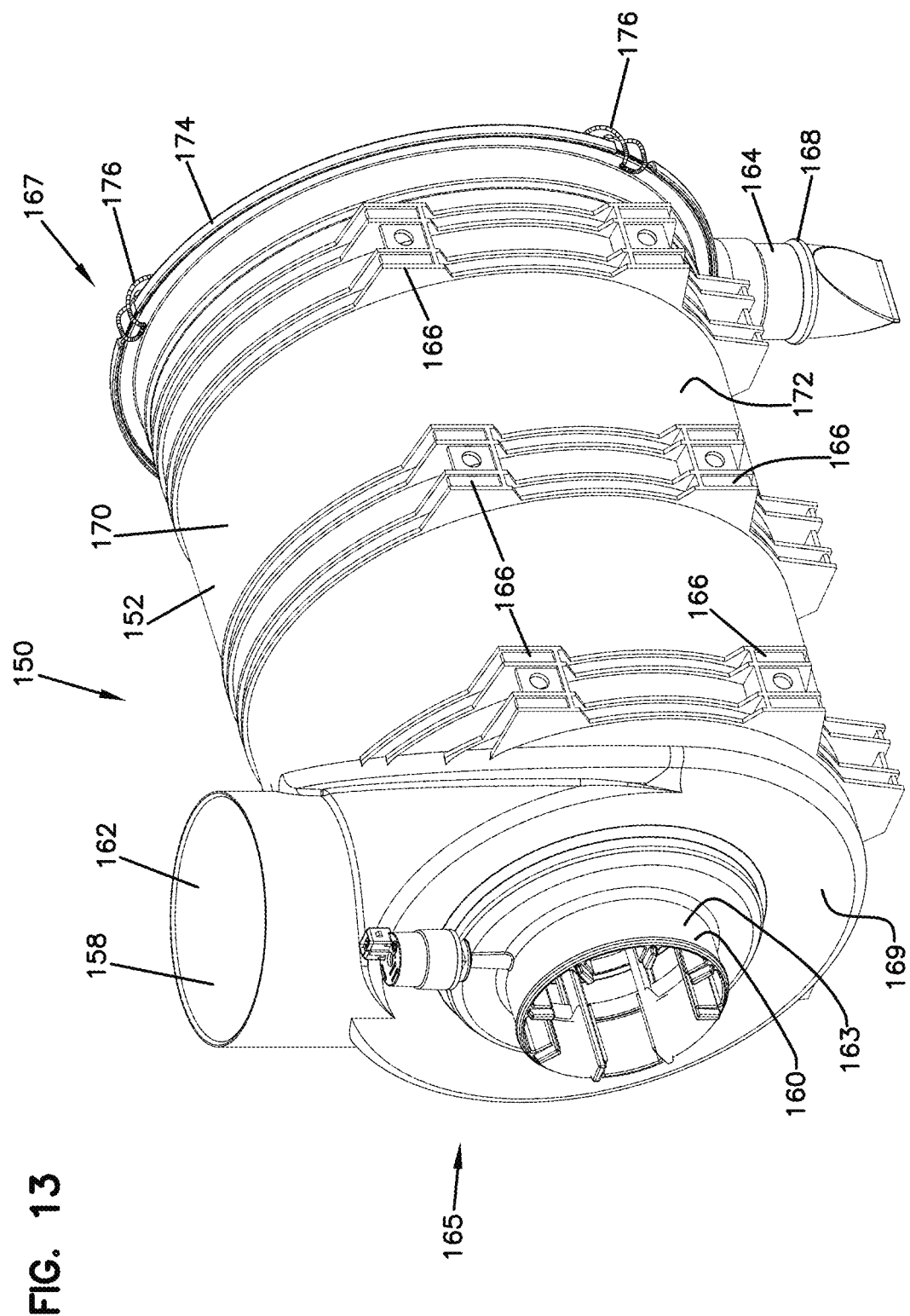
FIG. 13 is a side, perspective view of an alternative air cleaner assembly according to the present disclosure.

Now referring to FIGS. 1 and 11, an air cleaner assembly is shown at reference number 10. The air cleaner assembly 10 includes an air cleaner housing 12, a main filter element 14, and a safety filter element 16. The air cleaner assembly 10 can be applied in the filtering or cleaning of a variety of gases. The air cleaner assembly 10 is suited for cleaning air for use in an internal combustion engine, such as the engine of a vehicle such as a truck, bus, tractor, or construction equipment; or for a generator.

The air cleaner housing 12 includes an air inlet 18 and an air outlet 20. In FIG. 11, the air cleaner assembly 10 has been cutaway to show the internal components and, as a result, the air inlet 18 is not shown in FIG. 11. Nevertheless, it should be understood that the air inlet 18 is present on the operable air cleaner assembly 10. In general, dirty air or air in need of cleaning enters the air cleaner assembly 10 through the air inlet 18, and clean air exits the air cleaner assembly 10 through the air outlet 20.

The air cleaner housing 12 includes optional mounting legs or supports 22 thereon to facilitate mounting. Alternatively, the air cleaner assembly 10 can be mounted with a separate mounting band or bracket. The air cleaner assembly 10 can be provided in a variety of orientations. An exemplary orientation has the outlet 20 extending vertically. However, many of the principles and techniques described can be applied to air cleaner assemblies mounted in other orientations.

The particular air cleaner air cleaner housing 12 has a housing side wall 24 that can generally be considered as cylindrical in overall shape. The air inlet 18 can be referred to as a tangential inlet 26 that goes through the housing side wall 24. The term "tangential" in this context is meant to indicate that a center line of the air inlet 18 is not directed toward a center access of the air cleaner assembly 10, but rather is directed more tangentially. This causes the air entering through the tangential inlet 26 to begin movement in a swirling pattern. The swirling pattern is facilitated by the generally cylindrically shaped housing side wall 24. Alternatively, the air inlet can be provided so that it is radial. That is, the air entering through the air inlet can enter in a radial direction toward a center of the air cleaner assembly.

The air cleaner air cleaner housing 12 includes a main housing 28 and a service cover 30. For the particular air cleaner air cleaner housing 12, parts of the main housing 28 and the service cover 30 form the housing side wall 24. The service cover 30 is constructed so that it is removable from the main housing 28. Latches 32 are available for holding the service cover 30 onto the main housing 28. The particular latches 32 shown are a type of over center latch 34. Other types of latches can be used. The service cover 30 includes a closed end 36. In general, the characterization of a closed end means that mass air flow does not occur through the closed end 36. That is, the closed end 36 does not operate as an air inlet or outlet during operation of the air cleaner assembly 10.

The air outlet 20 can be characterized as a circular, axial, outlet 38. By "axial" in this context, it is meant that a center line or axis of the outlet 20 extends parallel to a center line or axis of the air cleaner housing 12. In the particular instance shown, the center line of the circular, axial, outlet 38 is coaxial with the center line of the air cleaner housing 12. Of course, alternative configurations are available. For example, the air outlet can be eccentrically positioned relative to the center line of the air cleaner housing 12.

The main housing 28 has a first end 29 and a second end 31. The air outlet 20 extends through the first end 29, and the air inlet 18 extends between the first end 29 and the second end 31. The service cover 30 attaches to the main housing 28 at the second end 31. The first end 29 and the second end 31 can both be characterized as open. The first end 29 can be characterized as open because of the presence of the air outlet 20 extending therethrough. The second end 31 can be characterized as open because the service cover 30 is removable from the first end 31. When the service cover 30 is attached to the second end 31, the air cleaner second end 35 can be characterized as closed. The air cleaner first end 33 can be characterized as open for the same reason that the main housing first end 29 is characterized as open.

Now referring to FIGS. 2-5, assembly of the safety liner 40 as part of the air cleaner housing 12 is shown. The safety liner 40 includes an open support structure 42, a safety liner closed end cap 44, and a plurality of attachment tabs 46 at a downstream end 48. The open support structure 42 is provided to support the safety filter element 16, and allow air to flow therethrough to the open interior 50 of the safety liner 40. During operation of the air cleaner assembly 10, air that flows into the open interior 50 can generally be considered clean air and flows out through the air outlet 20.

Figure 3:
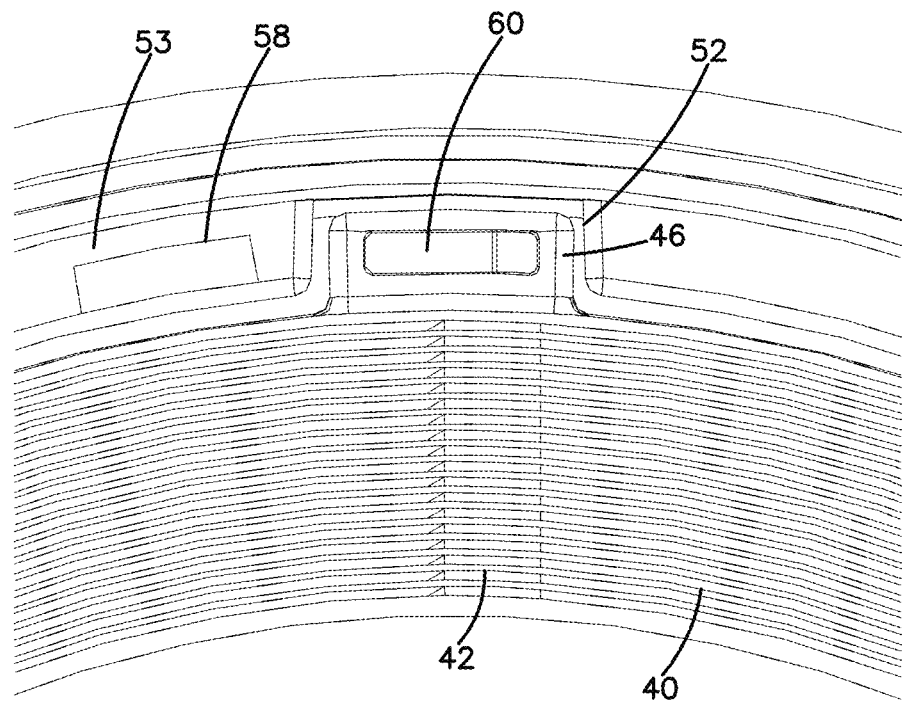
FIG. 3 is a perspective view showing attachment of the safety liner to the housing of the assembly of FIG. 1.
Figure 4:
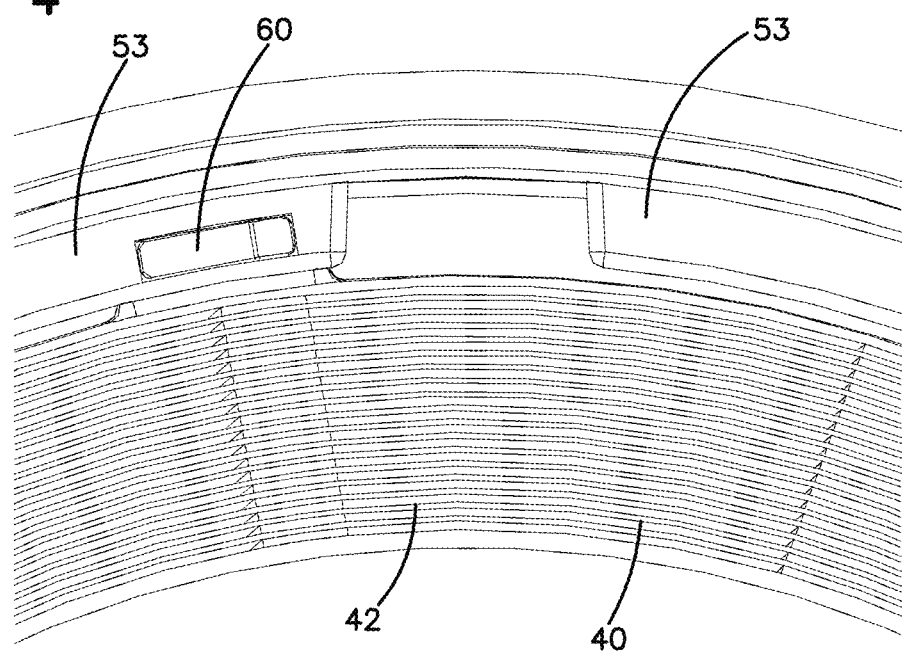
FIG. 4 is a perspective view showing attachment of the safety liner to the housing of the assembly of FIG. 1.

The attachment tabs 46 extend from the safety liner 40 so that they are capable of engaging openings 52 provided in the flange 53 of the air outlet 20. The attachment tabs 46 can be provided so that they extend at about a 90° angle relative to the cylindrically extending direction of the safety liner 40. The attachment tabs 46 can engage or fit within the openings 52 in the flange 53. The flange 53 extends sufficiently far away from the outlet collar 55 to receive the attachment tabs 46. As a result of a twisting movement of the safety liner 40, the attachment tabs can extend beneath the flange 53, and can snap into place within the snap fit opening 58. As shown in FIGS. 3 and 4, the attachment tabs 46 include a snap fit member 60 that fits within the snap fit opening 58. Once the snap fit member 60 engages the snap fit opening 58, the safety liner 40 can generally be considered to be locked in place and can be considered a part of the air cleaner housing 12.

Figure 2:
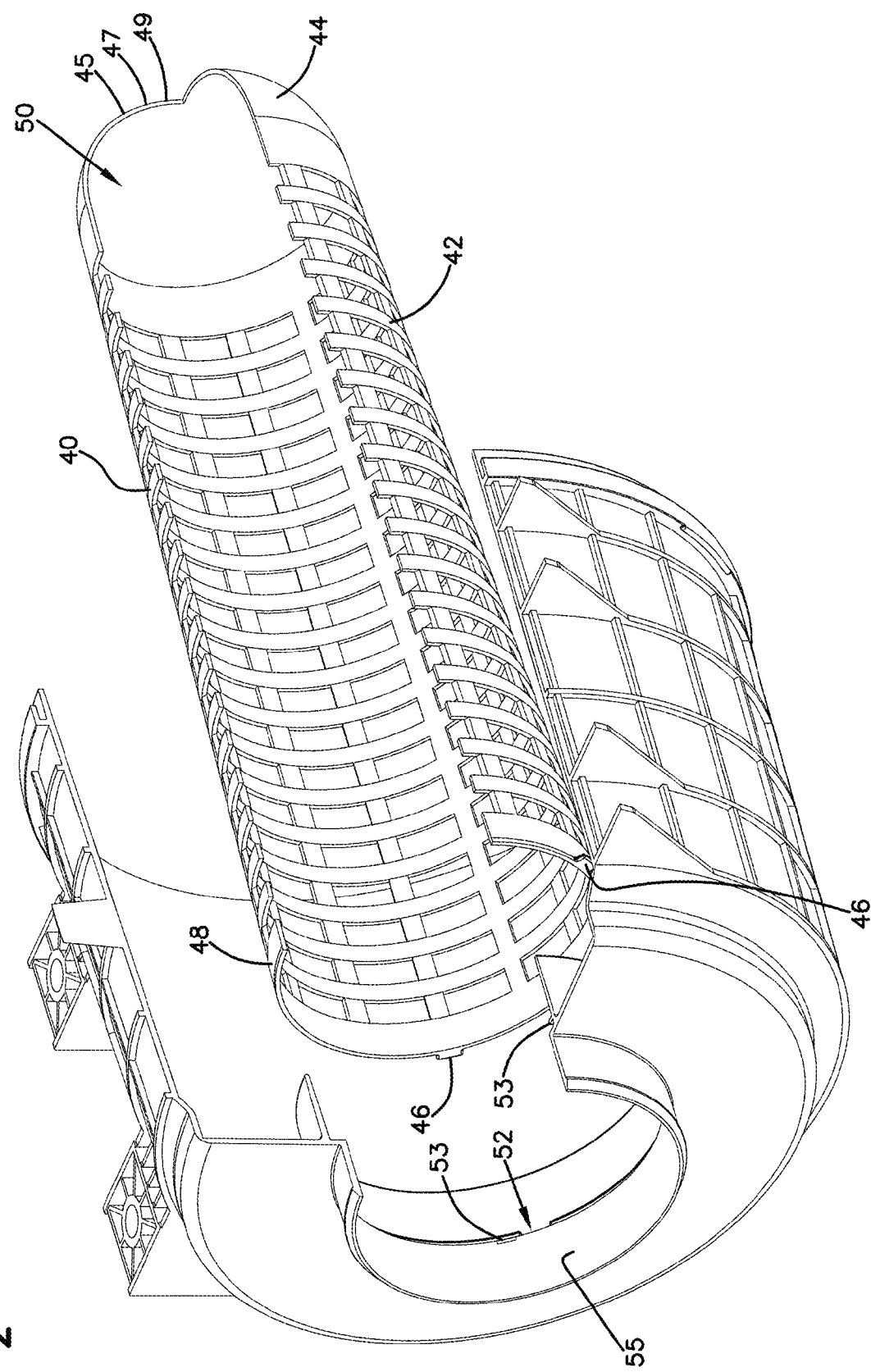
FIG. 2 is a cutaway, exploded, perspective view of components of the assembly of FIG. 1.
Figure 2A:
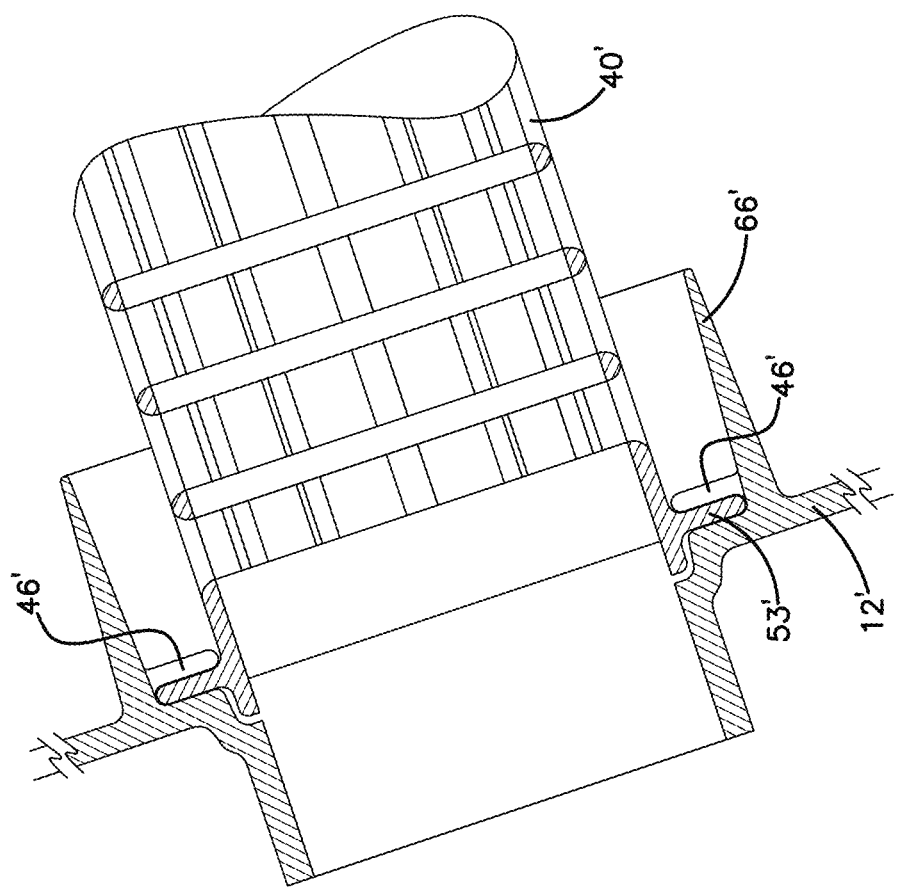
FIG. 2a is a cutaway, side, sectional view showing an alternative arrangement for attaching the safety liner to the air cleaner housing.

An alternative arrangement for attaching the safety liner 40' to the air cleaner housing 12' is shown in FIG. 2a. The safety liner 40' includes a flange 53' extending radially away from the axis of the air cleaner along a circumference of the safety liner 40'. The flange 53' includes openings (not shown but similar to openings 52 in the flange 53) for receipt of the attachment tabs 46' extending radially from the air cleaner housing 12'. The attachment tabs 46' can have a structure similar to the attachment tabs 46 except that they extend radially from the radial seal member 66'. In addition, the attachment tabs can include snap fit members, and the snap fit members can engage snap fit openings in the flange 53'.

Figure 5:
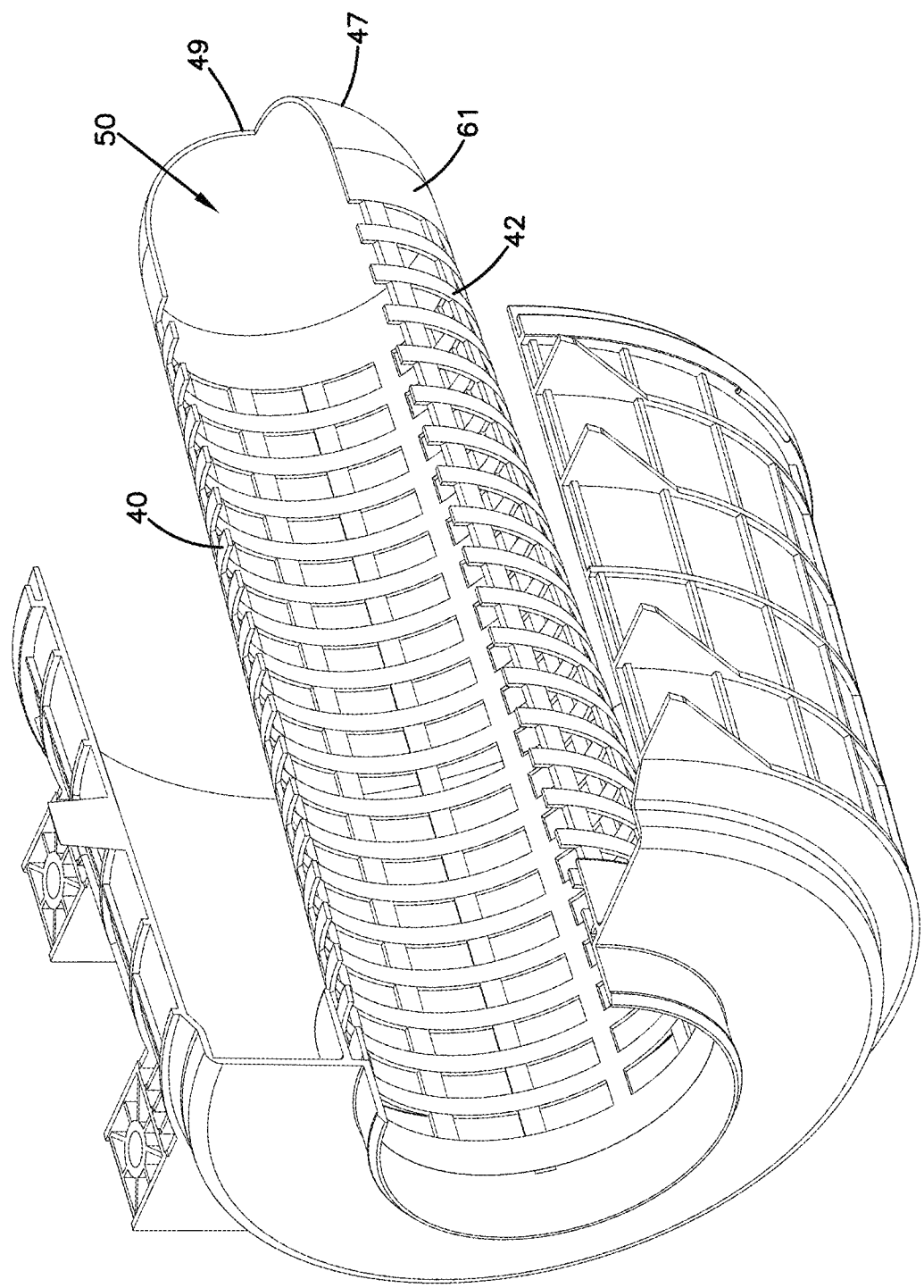
FIG. 5 is a cutaway, perspective view of components of the assembly of FIG. 1.
Figure 8:
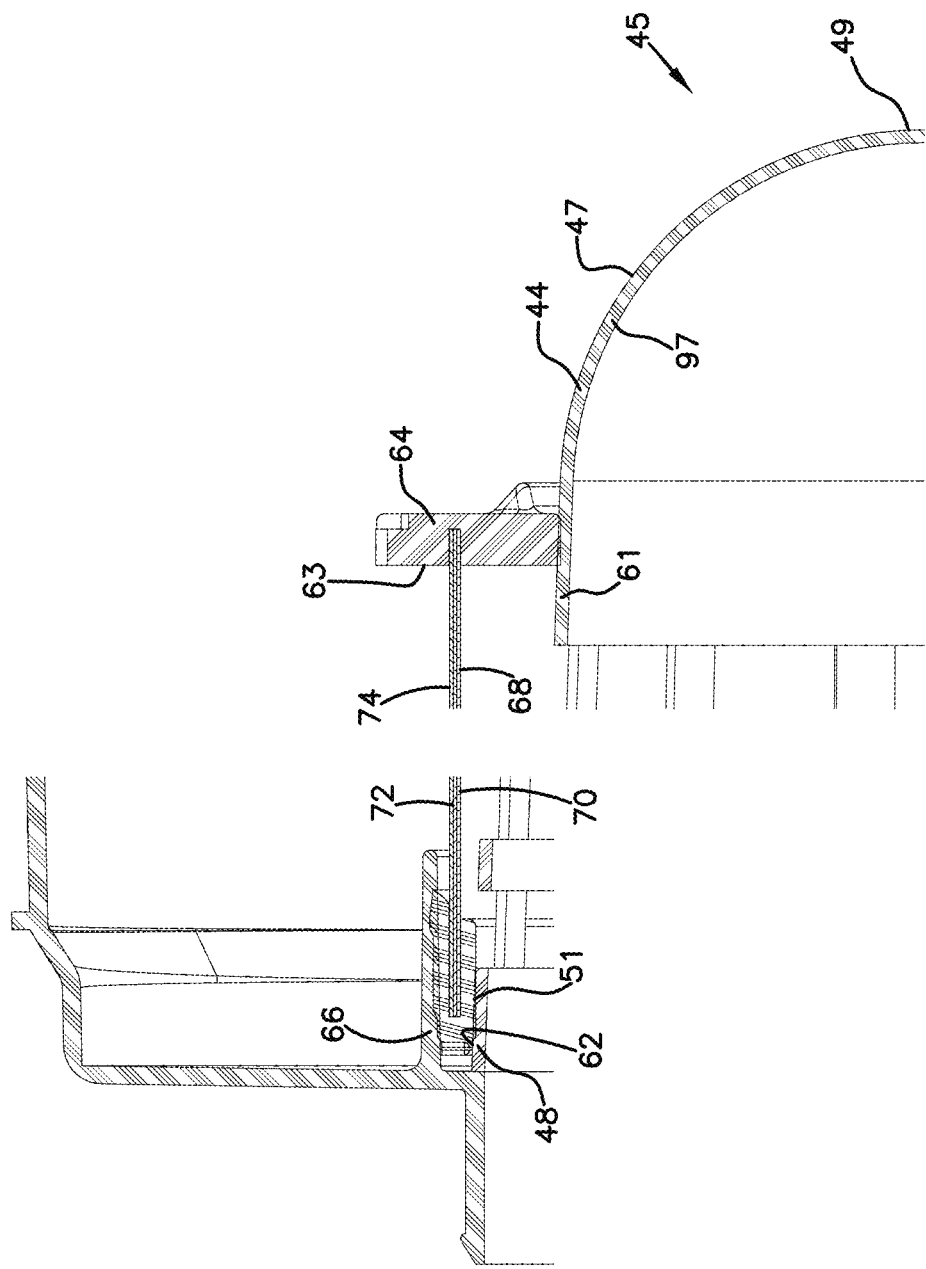
FIG. 8 is a partial, sectional view of the assembly of FIG. 7.

Now referring to FIGS. 2, 5, and 8, the safety liner closed end cap 44 can be characterized as having a spherical shape 45. By a spherical shape, it is meant that the outside surface 47 is generally curved and provides an apex 49 at about the center of the safety liner closed end cap 44. The safety liner closed end cap 44 can be provided with shapes other than a spherical shape.

Figure 6:
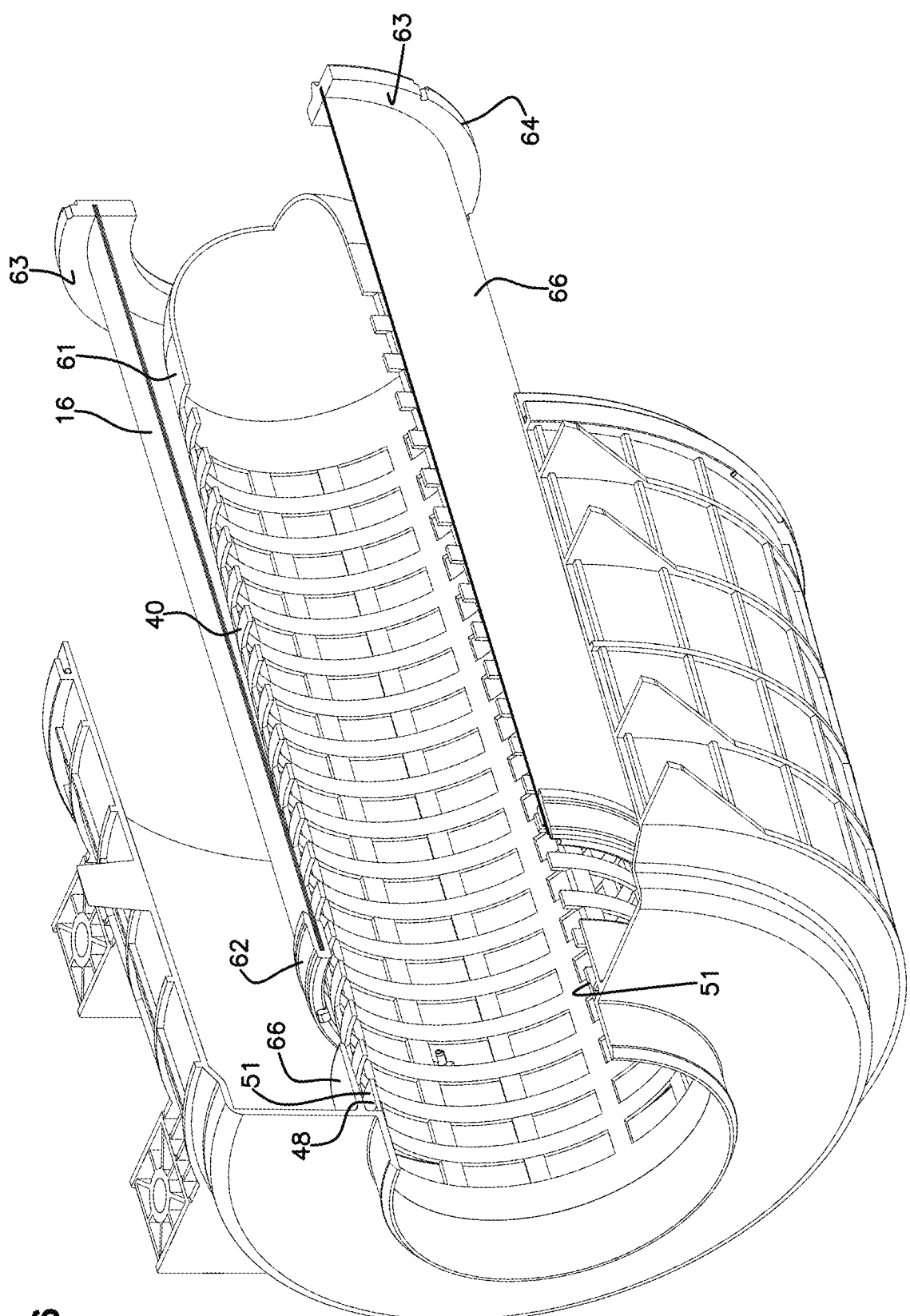
FIG. 6 is a cutaway, perspective view of components of the assembly of FIG. 1 showing attachment of a safety media.
Figure 7:
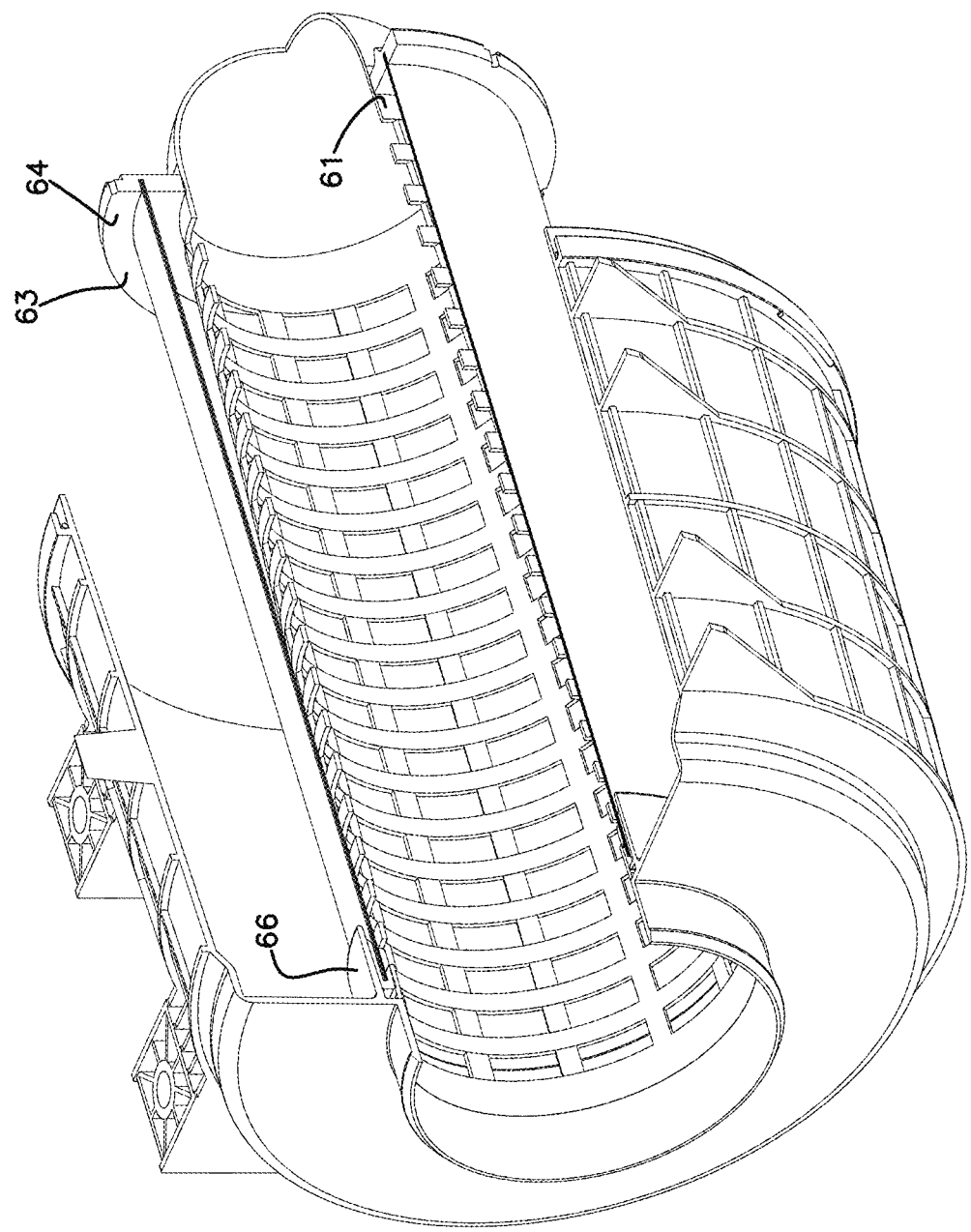
FIG. 7 is a cutaway, perspective view of components of the assembly of FIG. 1 showing attachment of a safety media.

Now referring to FIGS. 6-8, the safety filter element 16 extends over the safety liner 40. In FIG. 6, the safety filter element 16 is shown being applied over or removed from the safety liner 40. The safety filter element 16 includes a safety downstream seal member 62 and a safety end cap seal member 64. The safety downstream seal member 62 is provided for sealing between the downstream end 48 of the safety liner and a radial seal member 66 that is part of the air cleaner housing 12. The downstream end 48 of the safety liner can include a sealing surface 51 that can be considered part of the main housing 28. The safety downstream seal member 62 fits between the sealing surface 51 and the radial seal member 66 to provide a seal.

The safety filter element 16 includes a media structure 68. The media structure 68 is shown as a tri-layer structure including a first layer 70, a second layer 72, and a third layer 74. The first layer 70 and the third layer 74 can be provided as media, and the second layer 72 can be provided as a support structure to support the safety filter element 16 so that it maintains its shape. Alternatively, the first layer 70 and the third layer 74 can be support structure, and the second layer 72 can be filtration media. Other alternatives are possible. For example, the media structure can be provided as a by-layer structure including one layer or two layers of filtration media. The media structure 68 extends within the downstream seal member 62 so that the media structure 68 extends between the downstream end 48 of the safety liner 40 and the radial seal member 66. As a result, the media structure 68 assists in the seal between the downstream end 48 and the radial seal member 66.

The media structure 68 extends into the end cap seal member 64. The safety end cap seal member 64 provides a sealing engagement with the safety liner closed end cap 44. The end cap seal member 64 provides an annular seal around the end cap periphery 61. The safety end cap seal member 64 includes a gripping surface 63 that allows one to grasp the safety end cap seal member 64 and pull the safety filter element 16 off of the safety liner 40.

Now referring to FIGS. 9-12, placement of the main filter element 14 within the air cleaner housing 12 is shown. The characterization of a "main filter element" refers to the element that provides a majority of the air filtering function. The safety filter element is generally intended to protect the air inlet for the combustion engine during replacement of the main filter element 14. Accordingly, when the main filter element 14 is removed from the air cleaner housing 12, the safety filter element 16 remains in place to provide protection to the internal workings of the, for example, combustion engine.

The main filter element 14 includes a main filter element radial seal member 80, a main filter closed end cap 82, and filtration media 84. An exemplary type of filtration media 84 that can be used includes pleated media 86. The main filter element 14 can include a main filter element support 88 and a cover 90 to support and protect the filtration media 84. The cover 90 can be provided as a mesh or screen.

Figure 9:
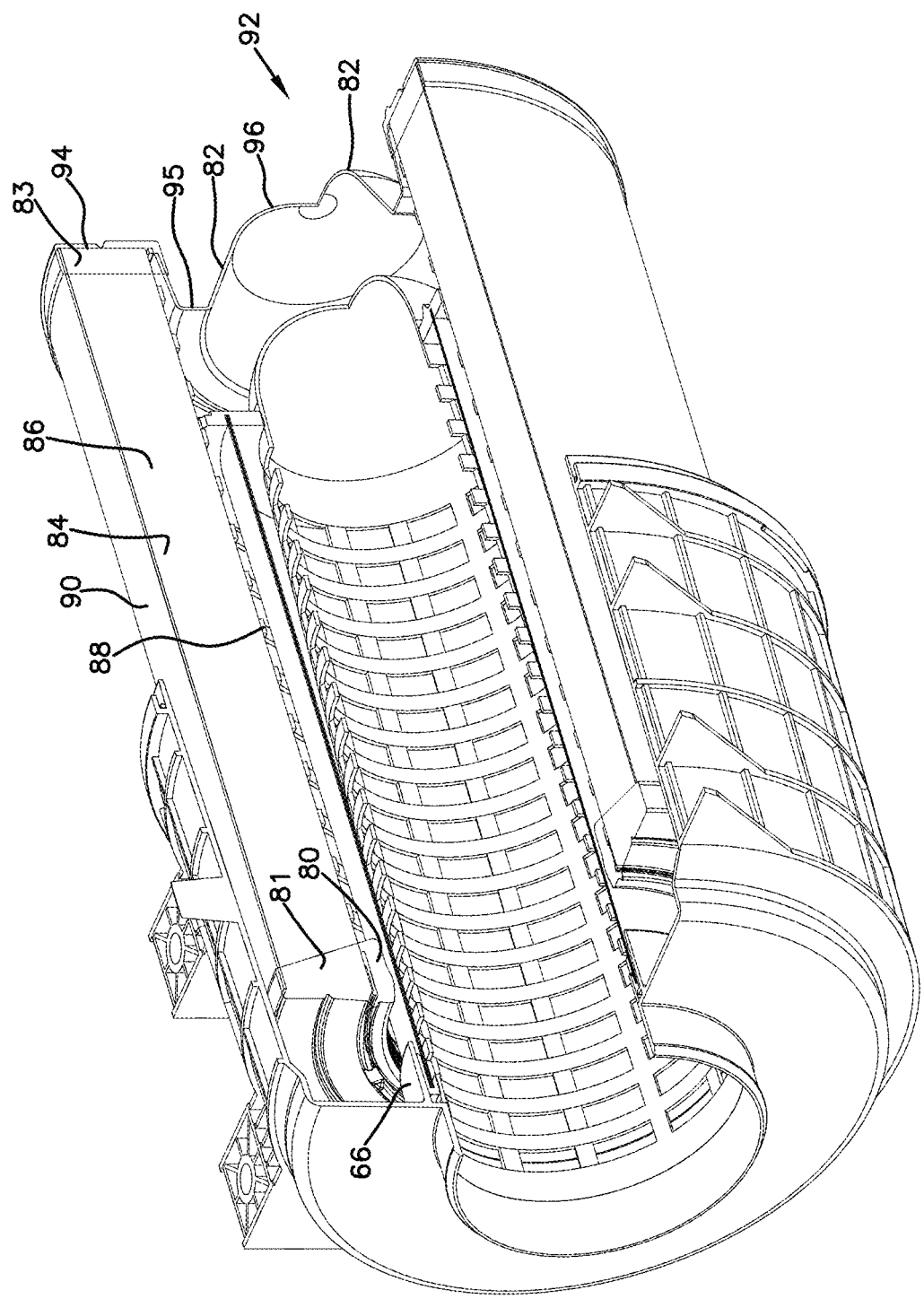
FIG. 9 is a cutaway, perspective view of the assembly of FIG. 7 showing attachment of the main filter element.
Figure 10:
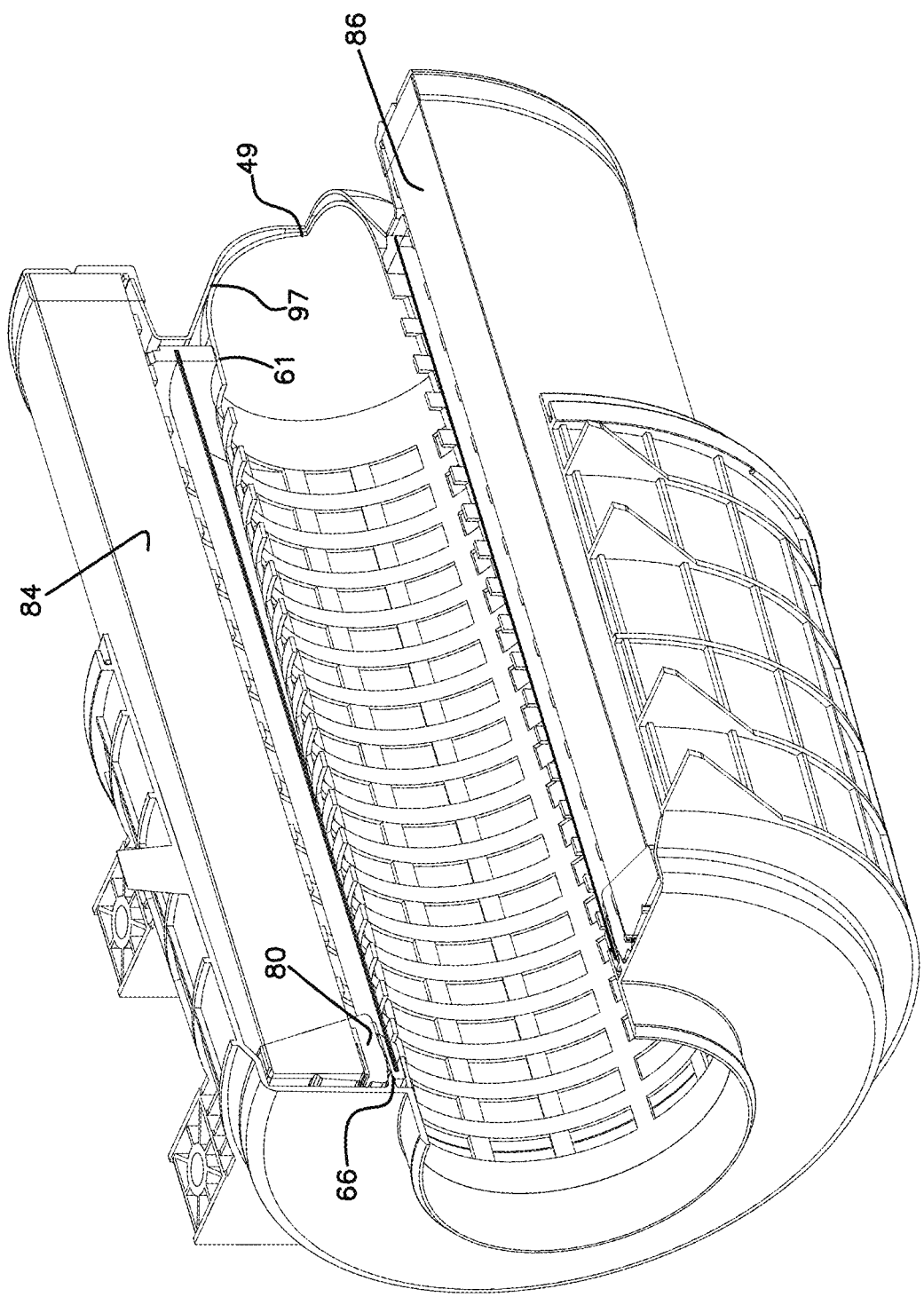
FIG. 10 is a cutaway, perspective view of the assembly of FIG. 7 showing attachment of the main filter element.

In FIG. 9, the service cover 30 has been removed from the air cleaner housing 12 and the main filter element 14 is being introduced into or removed from the housing interior 92. As shown in FIG. 10, the main filter radial seal member 80 forms a radial seal with the radial seal member 66 of the air cleaner housing 12. The radial seal member 80 can be characterized as an inward facing radial seal member because the sealing surface is provided toward the inner portion of the main filter element 14. In addition, it should be understood that the filtration media 84 can be potted within the first open end cap 81 that can contains the radial seal member 80, and the second closed end cap 83.

The closed end cap 82 includes an annular rim area 94, a recess 95, and a central bump 96. The annular rim area 94 generally covers the filtration media 84 that extends annularly or cylindrically within the housing interior 92. The filtration media 84 can be embedded within the main filter closed end cap 82 at the annular rim area 94. The central bump 96 can be provided having a sufficiently spherical shape or other shape so that when the main filter element 14 is fully inserted within the housing interior 92, the central bump 96 contacts or is supported by the safety liner closed end cap 44. In a preferred arrangement, the central bump 96 does not contact the safety closed end cap 44 at the apex 49, but does contact the safety closed end cap 44 or is supported by the safety closed end cap 44 along an annular area 97 between the apex 49 and the end cap periphery 61. In general, the closer the annular area 97 is to the end cap periphery 61, the larger the potential contact area. Increased contact area can assist with the stability of the main filter element 14 within the housing 12. In order to provide this contact, the closed end cap 82 includes a recess 95 between the annular rim area 94 and the central bump 96. The recess 95 can extend annularly between the annular rim area 94 and the central bump 96.

The service cover 30 can be attached to the main housing 28 and latched in place. The service cover 30 can include a service cover annular rim area 102, a service cover central bump 104, and a service cover recess 106. In general, the service cover annular rim area 102, the service cover central bump 104, and the service cover recess 106 can be provided so that they generally correspond with the closed end cap annular rim area 94, the closed end cap central bump 96, and the closed end cap recess 95. The service cover can help hold the main filter element 14 in place within the housing 12. The service cover annular rim area 102 can help push the main filter element 14 in place.

During operation, air enters the air cleaner assembly 10 through the air inlet 18. Air circulates between the housing side wall 24 and the main filter element 14, and passes through the main filter element 14 and then through the safety filter element 16, into the open interior 50, and out of the air cleaner assembly via the air outlet 20.

Now referring to FIGS. 13-22, an alternative embodiment of an air cleaner assembly is shown at reference number 150. The air cleaner assembly 150 can include a housing 152, a main filter element 154, and a safety liner 180. The air cleaner assembly 150 provides for the filtering or cleaning of a variety of gases such as air for internal combustion engines.

The housing 152 includes an air inlet 158 and an air outlet 160. The air inlet 158 can be characterized as a tangential air inlet 162. The air outlet 160 can be characterized as an axial air outlet 163. The housing 152 additionally can include an optional drop tube 164 and can include optional mounting legs 166. The drop tube 164 can include an ejector valve 168. The housing 152 includes a main housing 170 and a service cover 174 that attaches to the main housing 170. The drop tube 164 and the ejector valve 168 can be provided as part of the service cover 174 or if desired, can be provided as part of the main housing 170.

The air cleaner assembly 150, as well as the housing 152, can be characterized as having a first end 165 and a second end 167. In general, the air outlet 160 can be characterized as extending through a housing end 169 at the first end 165. In addition, the air inlet 158 can be characterized as being provided between the first end 165 and the second 167, but can also be characterized as adjacent to the first end 165 in the embodiment shown in FIG. 13. The service cover 174, in the embodiment shown, can be characterized as attaching at the housing second end 167.

The housing 152 includes a main housing 170. The main housing 170 can be characterized as having a relatively cylindrical housing side wall 172. The air cleaner housing 152 includes a service cover 174 that attaches to the main housing 170. The service cover 174 can attach to the main housing 170 by latches 176.

Figure 14:
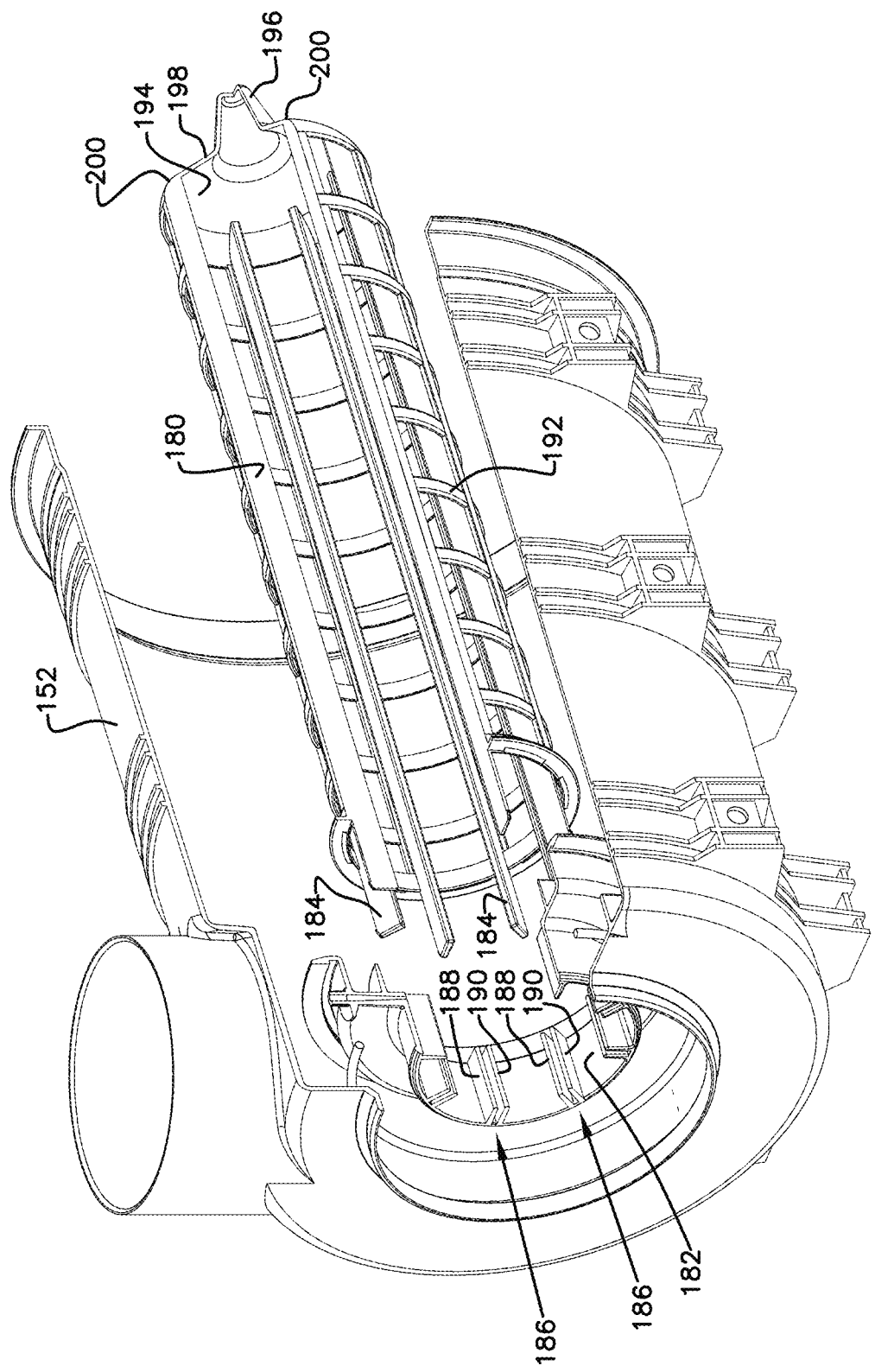
FIG. 14 is a cutaway, exploded, perspective view of components of the assembly of FIG. 13.
Figure 15:
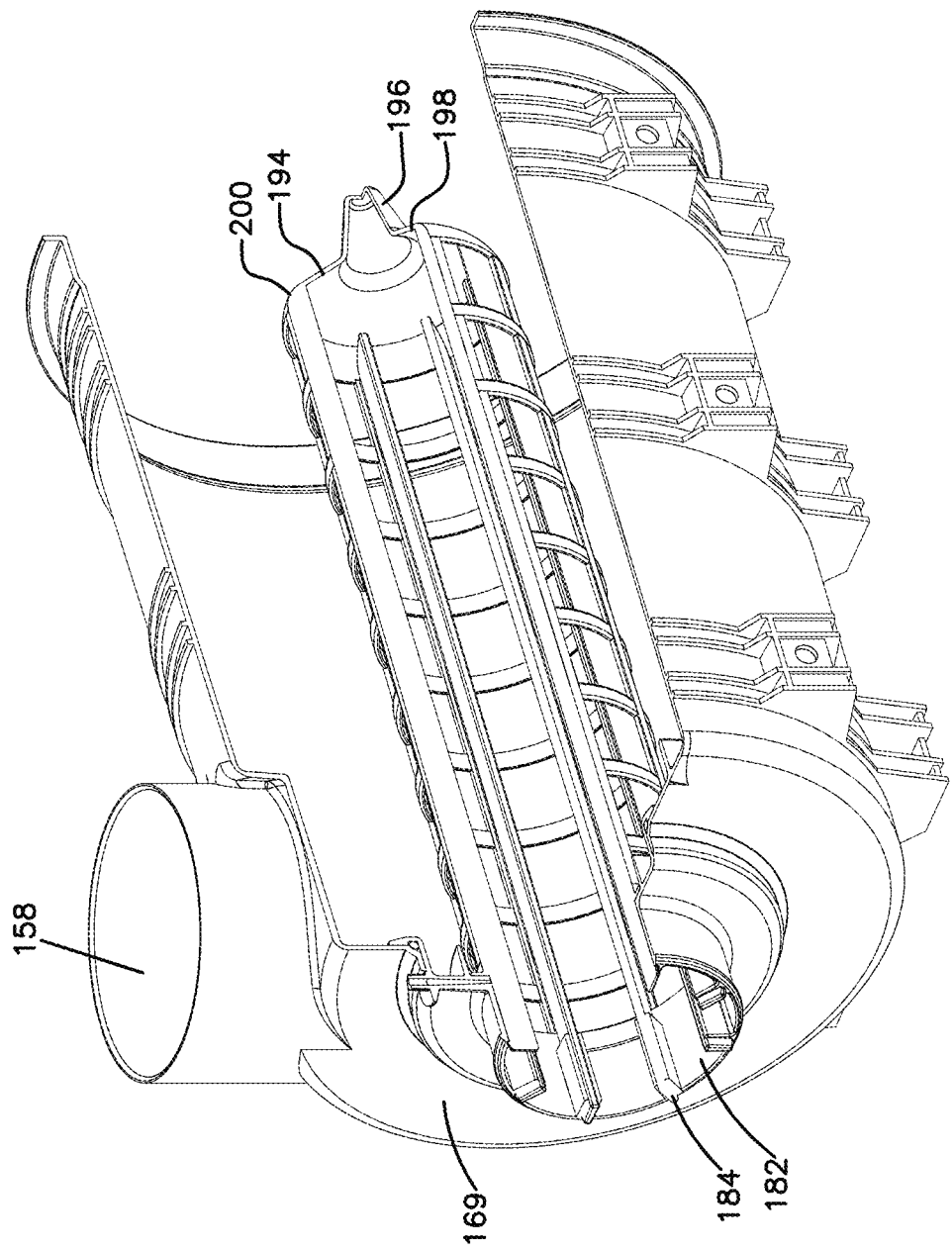
FIG. 15 is a cutaway, perspective view of a portion of the assembly of FIG. 13.
Figure 16:
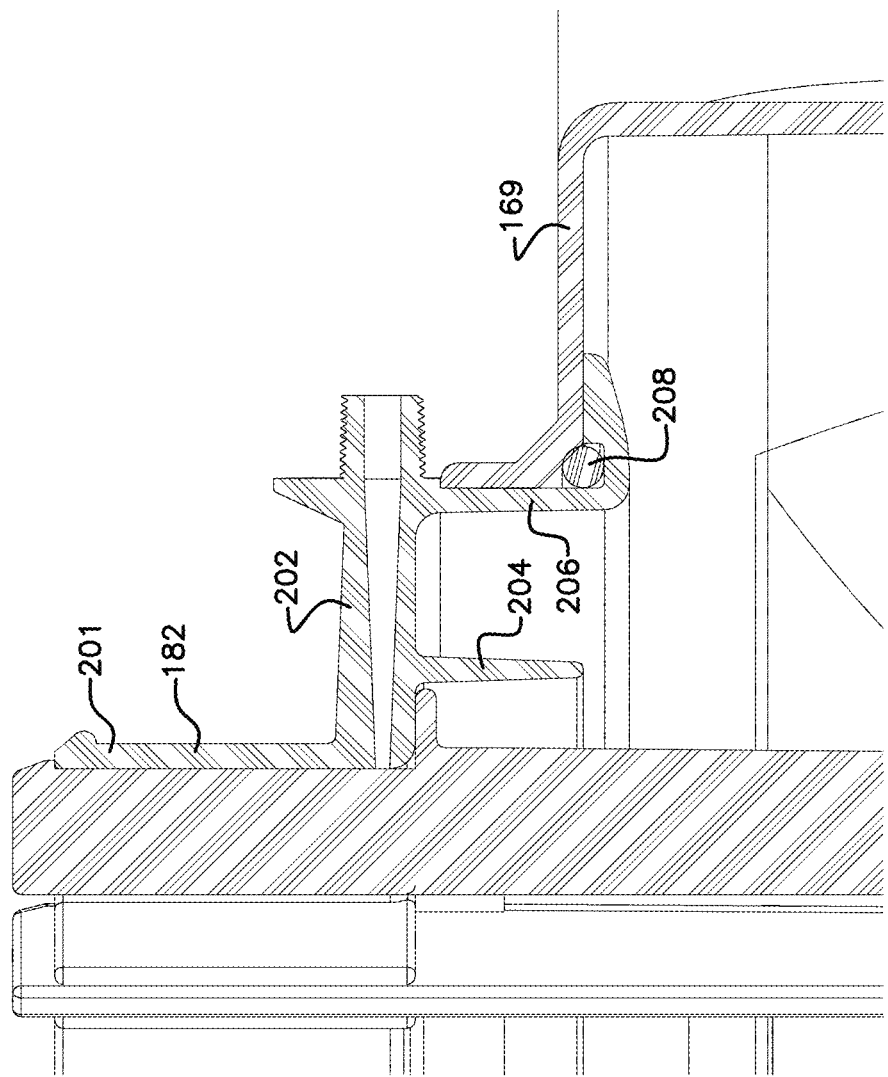
FIG. 16 is a partial, sectional view of the assembly of FIG. 15.

Now referring to FIGS. 14-16, attachment of the safety liner 180 to the collar 182 is shown. The safety liner 180 includes bayonets 184, and the collar 182 includes bayonet receivers 186. The bayonets 184 slide within the bayonet receivers 186 to fit. The bayonet receivers include first side walls 188 and second side walls 190. The first side walls 188 and the second side walls 190 hold the bayonets 184 in place. In addition, the bayonet receivers 186 can be molded in place. By way of example, the safety liner can include about 4 to about 8 bayonets and the collar can include about 4 to about 8 bayonet receivers to receive the bayonets.

The safety liner 180 additionally includes a support structure 192 for supporting the safety filter element 156. In addition, the safety liner 180 includes a closed end cap 194. The closed end cap 194 includes a central cone extension 196, and a shoulder area 198 extending about the central cone extension 196 and between the central zone extension 196 and the closed end cap periphery 200. The closed end cap periphery 200 generally refers to the annular edge region at the periphery of the closed end cap 194.

The collar 182 includes an arm 201, a collar extension 202, a safety seal member 204 extending from collar extension 202, and a radial seal member 206 extending from the collar extension 202. A gasket or o-ring 208 can be provided to seal the collar 182 to the downstream end cap 169 of the housing 152. The collar 182 can be snap fit onto the housing end 169. The snap fit assembly is generally shown in FIGS. 14 and 16.

Figure 17:
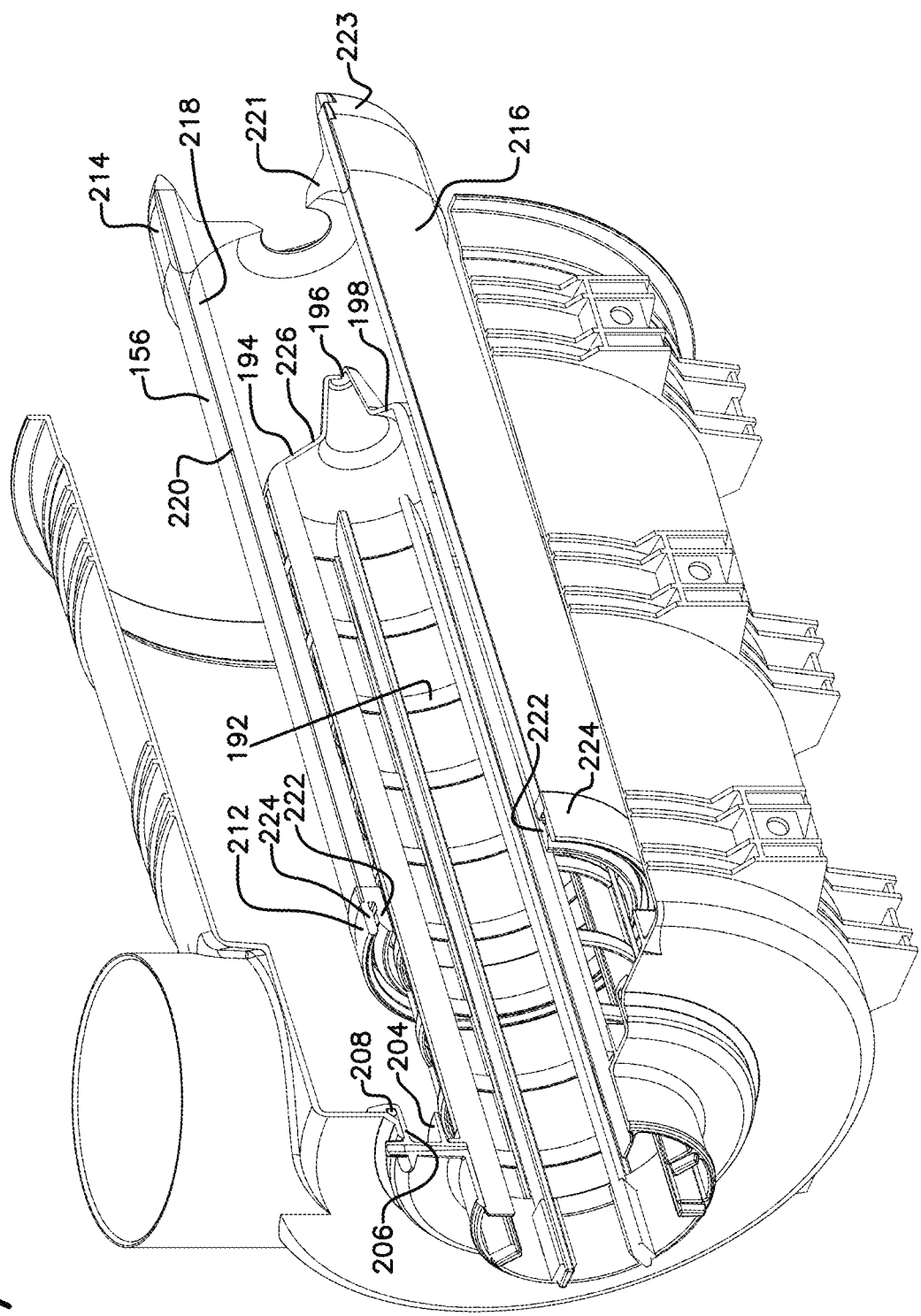
FIG. 17 is a cutaway, perspective view showing attachment of the safety filter media.
Figure 18:
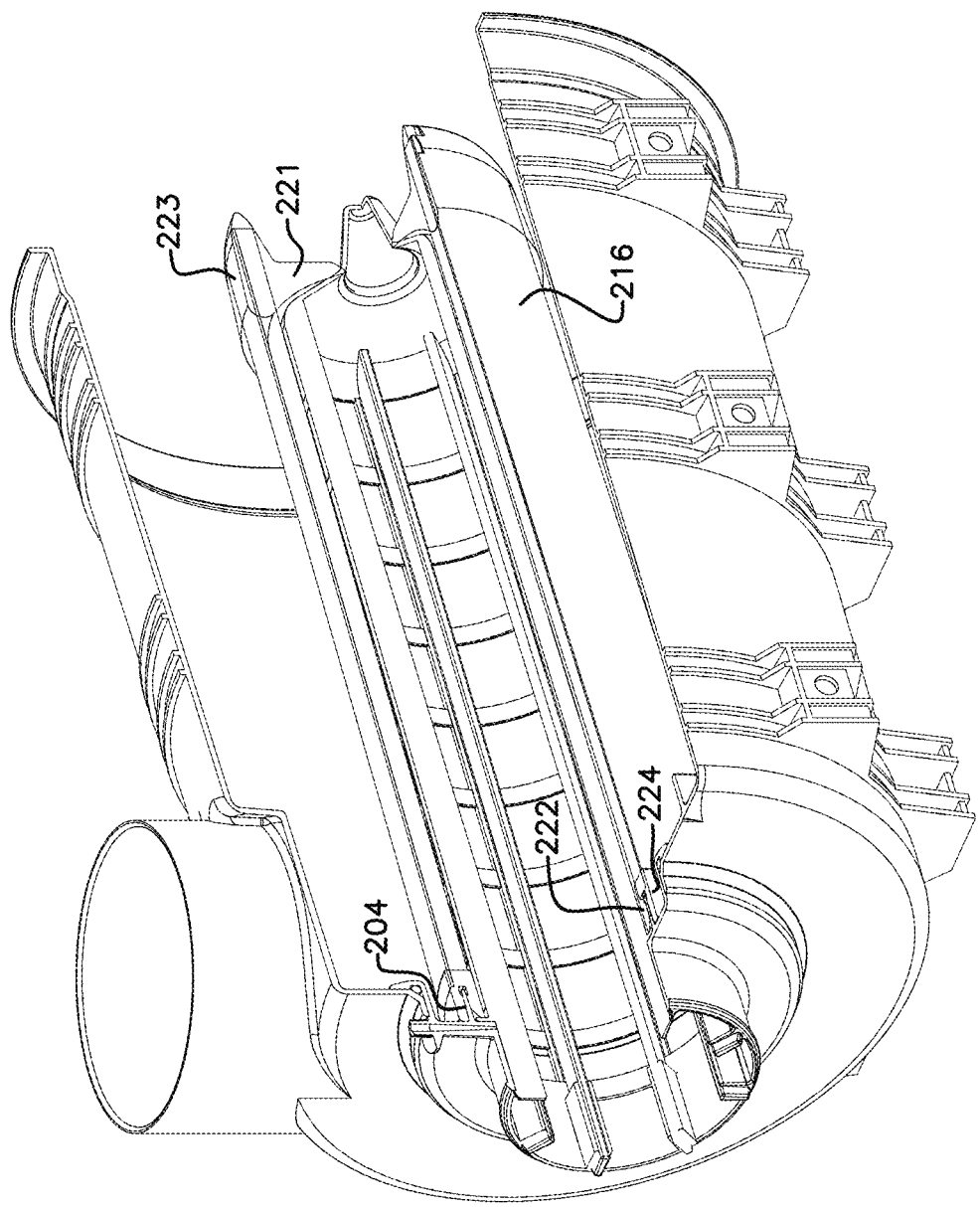
FIG. 18 is a cutaway, perspective view showing attachment of the safety filter media.
Figure 19:
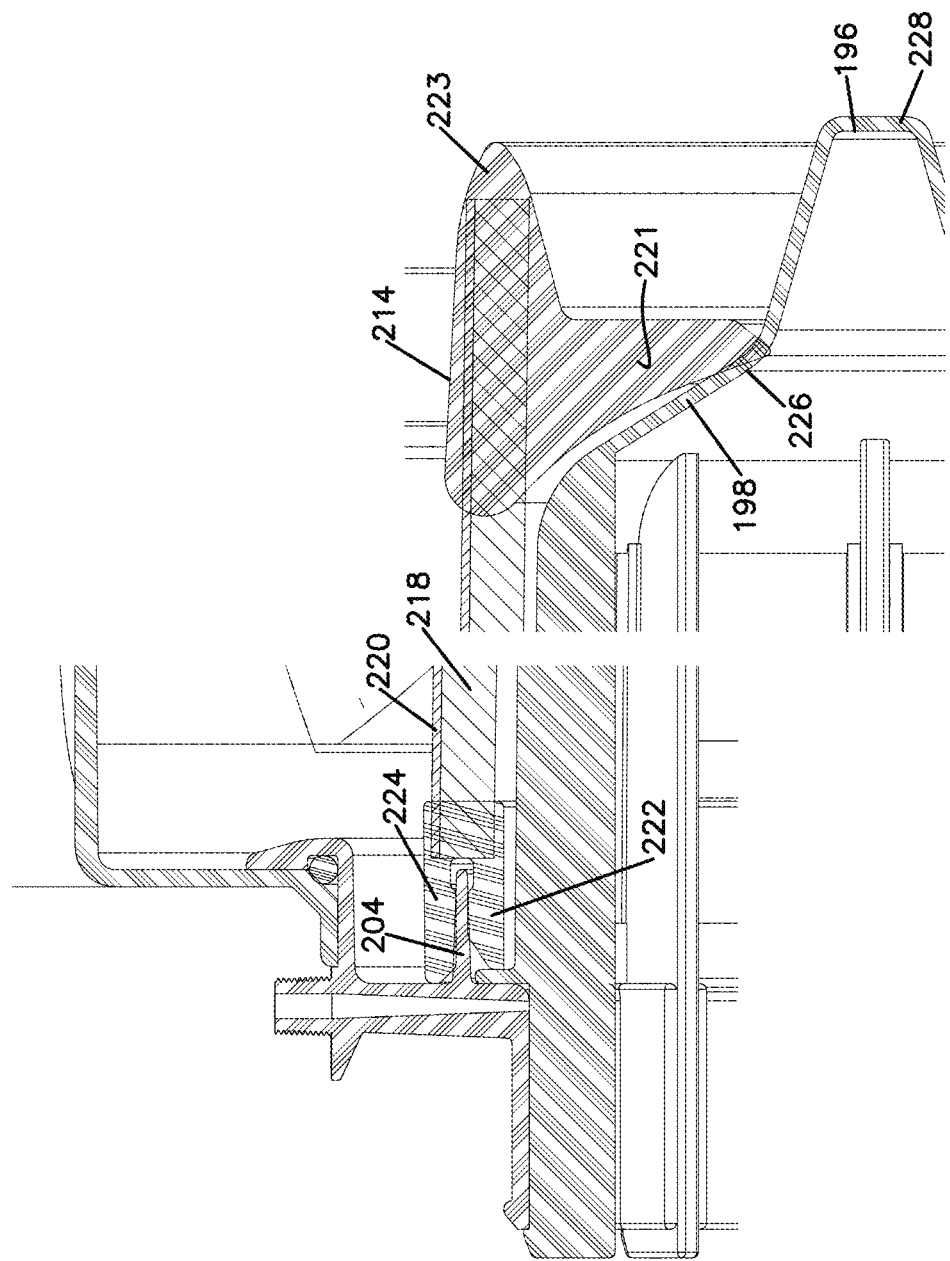
FIG. 19 is a partial, sectional view of the assembly of FIG. 18.
Figure 20:
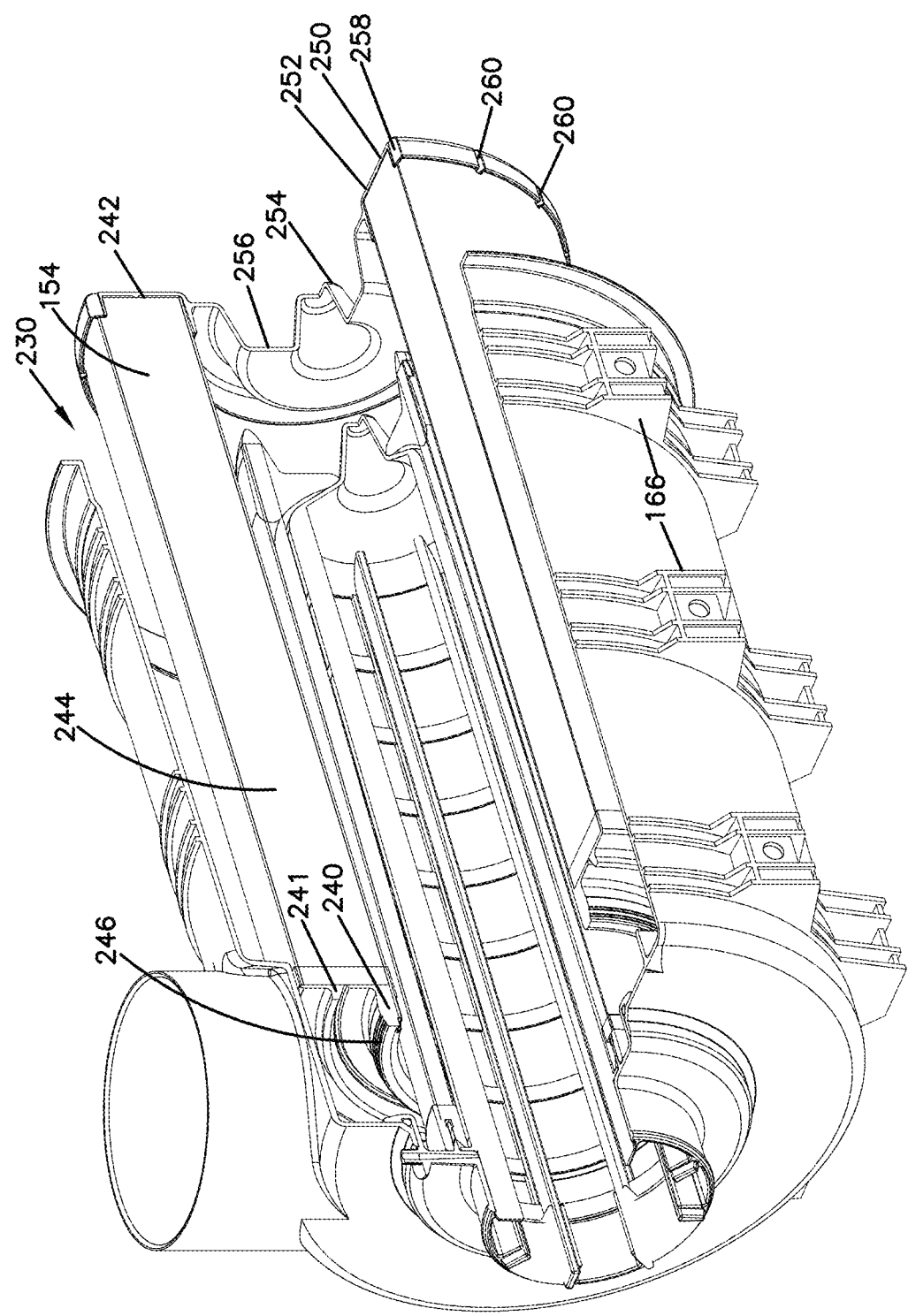
FIG. 20 is a cutaway, perspective view showing attachment of the main filter element.
Figure 21:
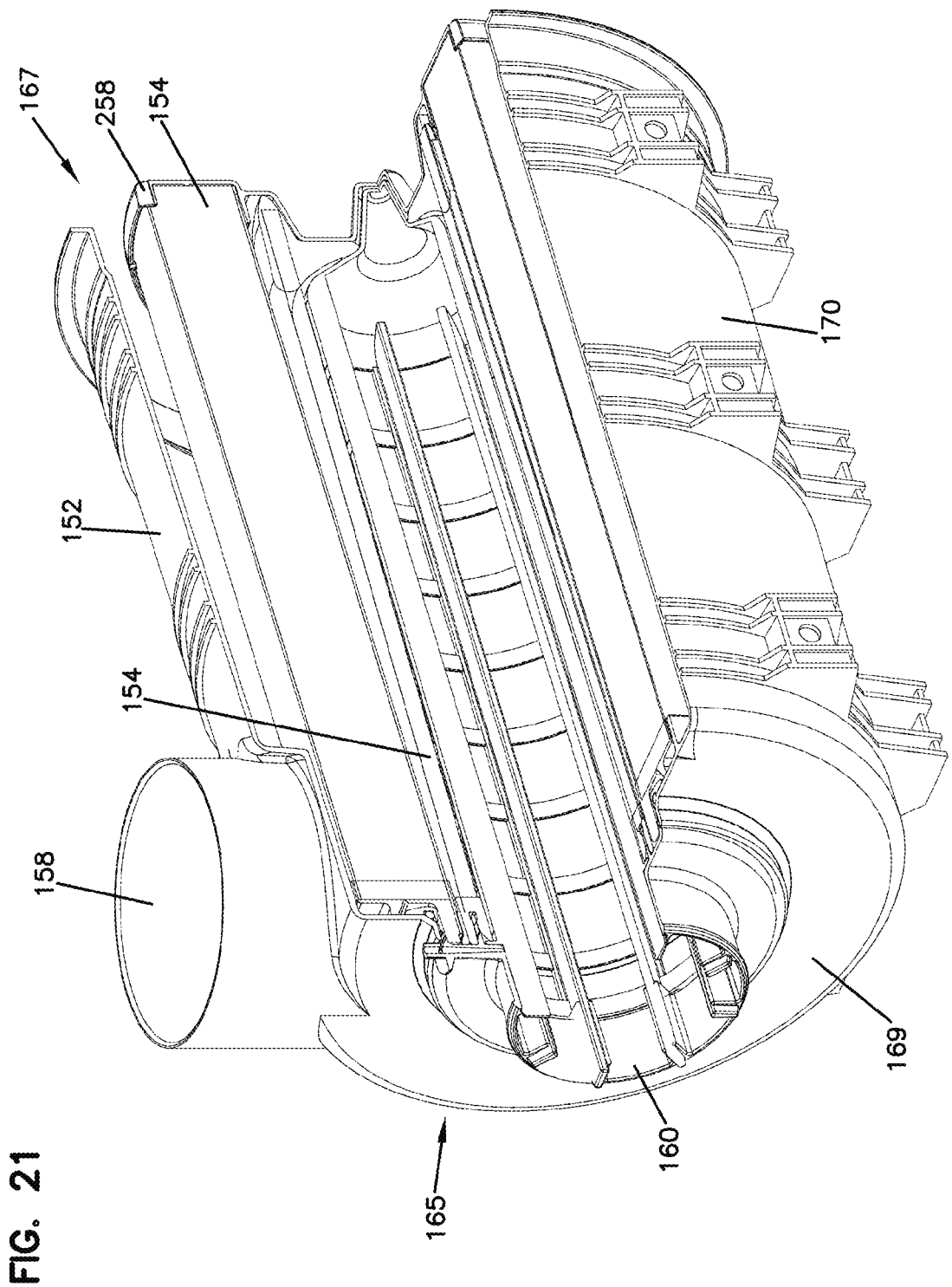
FIG. 21 is a cutaway, perspective view showing attachment of the main filter element.
Figure 22:
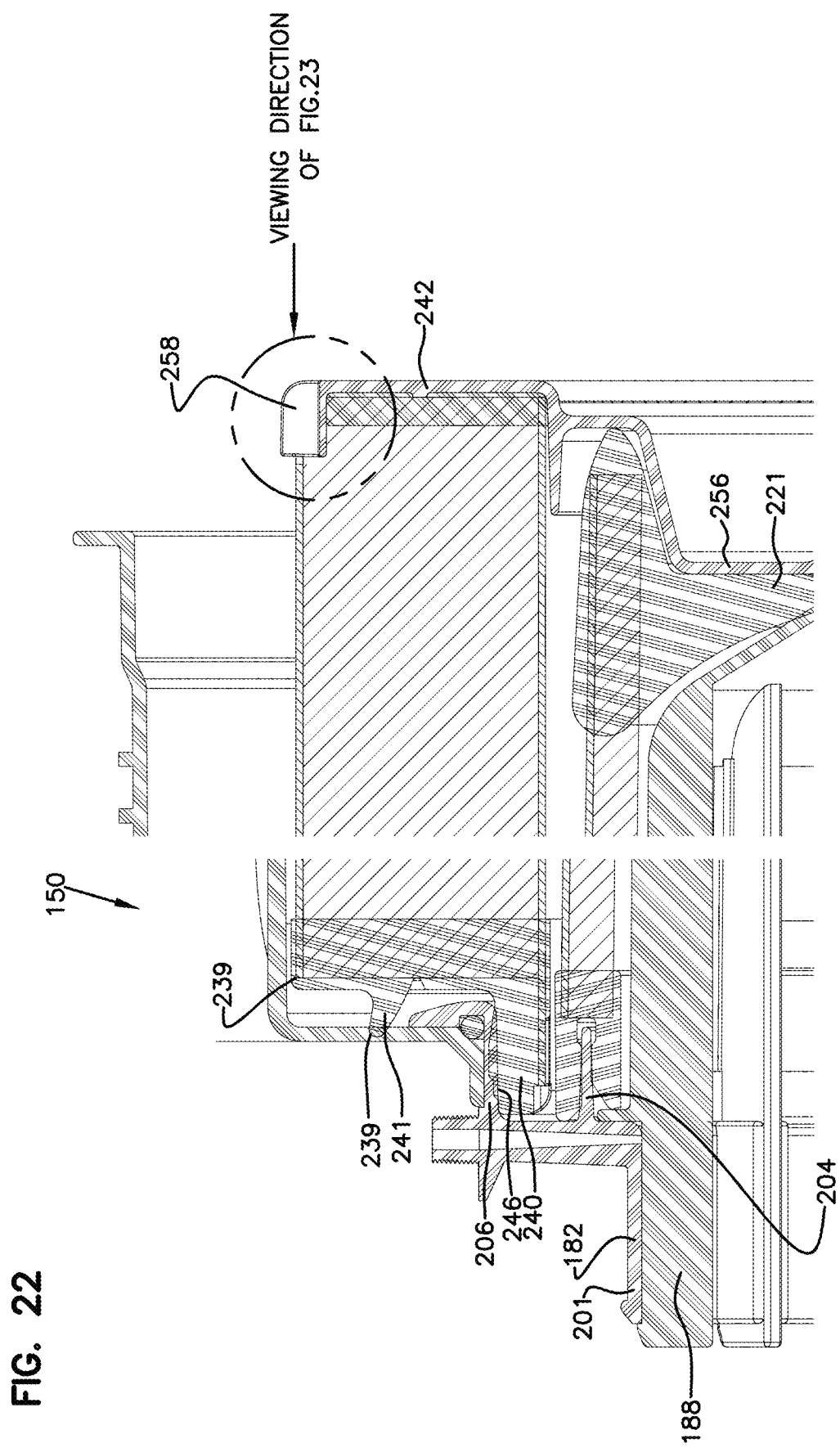
FIG. 22 is a partial, sectional view of the assembly of FIG. 13 without the access cover.
Figure 23:
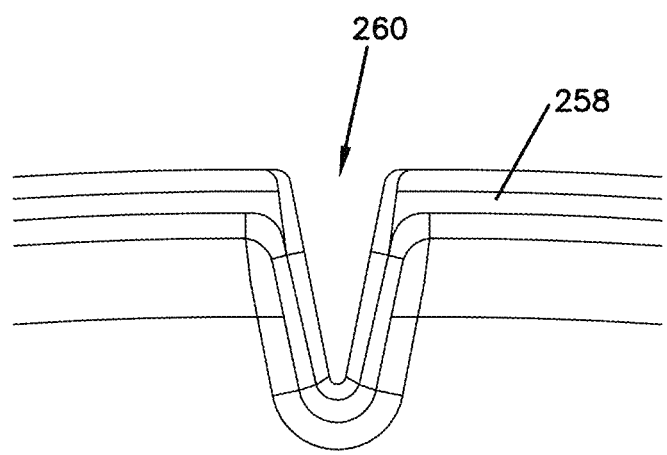
FIG. 23 is a end view showing the slot on the closed end of the main filter element of FIG. 22.
Figure 24:
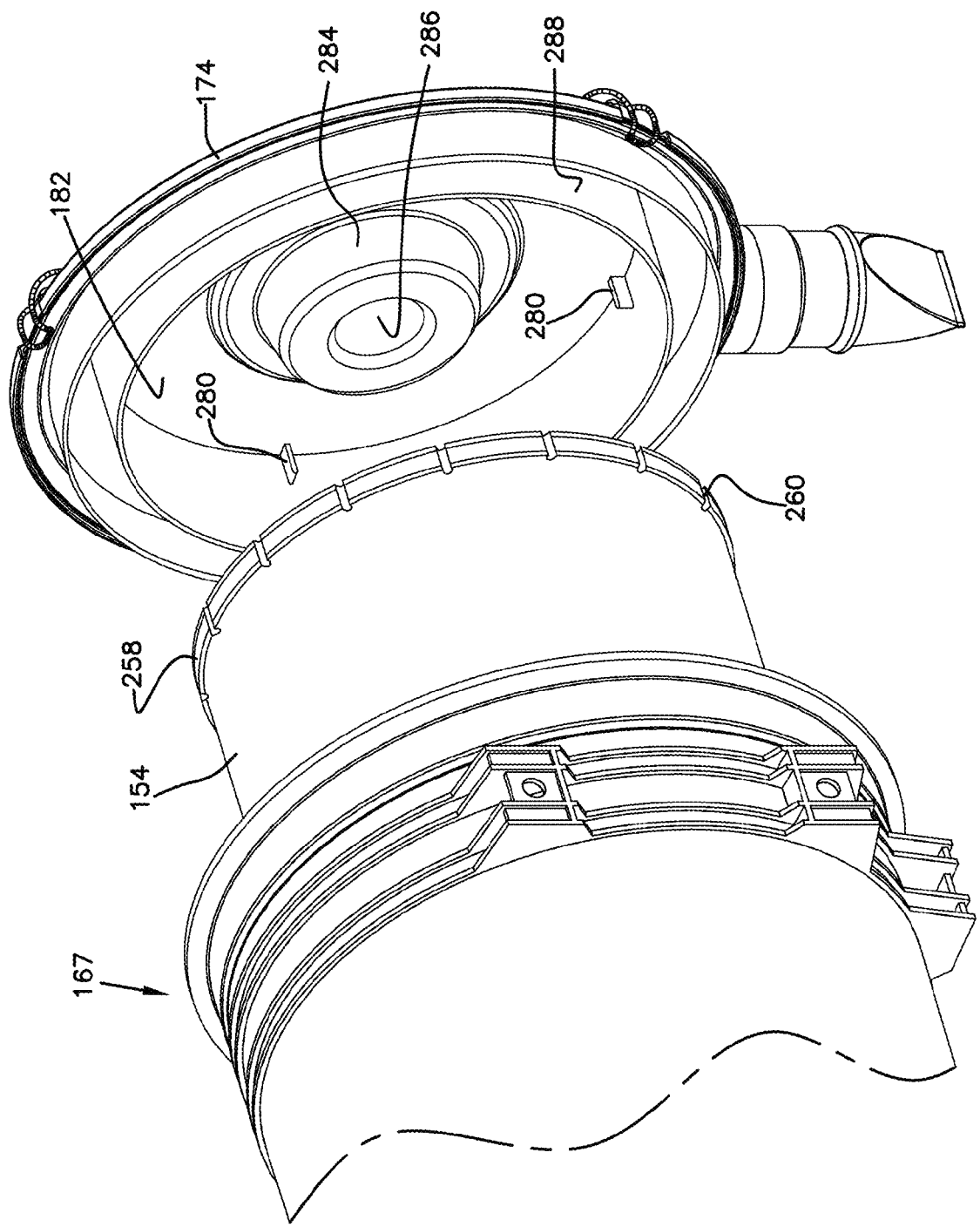
FIG. 24 is a partial, exploded view of the assembly of FIG. 11.

Now referring to FIGS. 17-19, placement of the safety filter element 156 on the support structure 192 is shown. The safety filter element 156 includes a safety seal member 212, a safety end cap seal member 214, and a safety media structure 216.

The safety media structure 216 can be provided similar to the safety media structure 68. The safety media structure 216 can be provided having a layer of filtration media 218 and a layer of support structure 220. The layer of filtration media 218 can, if desired, be pleated media.

The safety seal member 212 includes a lower seal member 222 and an upper seal member 224. The safety seal member 212 engages the safety seal member 204 to provide a seal so that the lower seal member 222 and the upper seal member 224 provide compressive force on the safety seal member 204. The safety seal member 204 can be referred to as the housing safety seal member because it is part of the housing. The safety seal member 212 can be referred as a pinch radial seal because the lower seal member 220 and the upper seal member 224 compress the safety seal member 204. The safety seal member 212 can be made of polyurethane material.

The safety end cap seal member 214 includes a first extension arm 221 that engages the closed end cap 194 at a base 226 of the central cone extension 196. The base 226 can be provided as part of the shoulder 198. The base 226 helps seal, center, support, and guide the safety filter element 156 on the support structure, and avoid risk of collapsing. The safety end cap seal 214 includes a second extension arm 223 that extends axially along a length of the safety media structure 216. The second extension arm 223 extends beyond the first extension arm 221 axially toward the apex 228 of the central cone extension 196. The safety end cap seal member 214 can be provided as a polyurethane material. In addition, the structure of the safety end cap seal member 214 can provide a desirable guide for the safety media structure 216 during the molding process.

Now referring to FIGS. 20-24, insertion of the main filter element 154 into the housing interior 230 is shown. The main filter element 154 includes a first open end cap 239, a second closed end cap 242, and a main filtration media 244 extending from the first open end cap 239 to the second closed end cap 242. The first open end cap 239 includes a radial seal member 240 and an axial seal member 241. The radial seal member 240 includes a radial seal surface 246 that engages the radial seal member 206 to create an annular, radial seal. The radial seal member 240 can be characterized as an outwardly directed radial seal because the direction of the seal is outward and toward the radial seal member 206. The radial seal member 206 can be referred to as the housing radial seal member 206, and the radial seal member 240 can be referred to as the main filter element radial seal member 240. The axially seal member 241 is provided extending axially from the first open end cap 239. The axially seal member 241 can be characterized as a molded-in-place lip type axially seal 243. That is, the lip type axially seal can be provided so that it flexes when the main filter element is introduced into the housing. This allows the main filter element to absorb and tolerate the length of the main filter element while avoiding friction that can cause where between the main filter element and the service cover. The axially seal member 241 can be provided extending axially from the first open end cap 239 between the radial seal member 240 and the outer, peripheral 243 of the first open end cap 239. Furthermore, the main filtration media 240 can be potted within the first end cap 239 and within the second closed end cap 242. The first end cap 239 and the second end cap 242 can be made from polyurethane material.

The end cap 242 can be characterized as a closed end cap 250. The end cap 242 includes an annular rim area 252, a central bump 254, and a recess 256 between the annular rim area 252 and the central bump 254. The annular rim area 252 and the central bump 254 can be considered extending axially away from the first end 165. Similarly, the recess 256 can be characterized as an area extending axially toward the first end 165. In general, the annular rim area 252 contains the filtration media and extends cylindrically or conically. The central bump 254 is constructed to receive the central cone extension 196 when the main filter element 154 is fully inserted within the housing interior 230. The recess 256 is constructed to engage the first extension arm 221 and provide contact between the recess 256 and the first extension arm 221. This contact that can extend annularly or circumferentially can help hold the safety filter element 156 in place.

The annular rim area 252 includes an annular rim periphery 258 and can include a series of exterior slots 260. The service cover 174 can be constructed to engage the slots 260 via bumps 280 on the service cover 174 to help hold the main filter element 154 in place to avoid rotation and vibration that might cause it to wear out.

The service cover 174 can be provided having an inner surface 282 that generally conforms to the closed end cap 250. In general, the inner surface 282 can include a projection 284 that fits within the recess 256, and can include a reverse cone 286 that receives the central bump 254. Furthermore, the inner surface 282 can include an annular rim 288 that surrounds the main filter element 154. The service cover 174 can be made of a plastic material and can be designed to guide, support, and push the safety element in place and participate to maintain the seal between the safety filter element 156 and the safety liner 180.

We claim:

1. A safety air filter element for use with an air cleaner also having a main air filter cartridge therein; the safety air filter element being configured to be positioned under the main air filter cartridge, in use; the safety air filter element comprising:
    (a) air filtration media surrounding an open filter interior and having first and second, opposite, media ends;
    (b) the first end of the air filtration media surrounding a central air flow aperture and having a radially outwardly directed housing seal member that surrounds the air filtration media; and,
    (c) an end cap at the second end of the air filter media having a portion molded to the air filter media; the end cap including a portion projecting across the open filter interior, from the air filter media, to a location surrounding an aperture that extends therethrough.

2. A combination of a safety air filter element and a main air filter cartridge, for use in an air cleaner; the combination comprising:
    (a) a safety air filter element having:
        (i) air filtration media surrounding an open filter interior and having first and second, opposite, media ends;
        (ii) the second end of the air filtration media of the safety air filter element having an end cap with a portion molded to the air filter media of the safety air filter element; the end cap including a portion projecting across the open filter interior, from the safety air filter media, to a location surrounding an aperture therethrough; and,
    (b) a main air filter cartridge separate from the safety air filter element and comprising:
        (i) first and second, opposite, end caps;
        (ii) air filtration media surrounding a media open interior and positioned in extension between the first and second ends of the main air filter cartridge; the second end cap of the main air filter cartridge including a portion projecting toward the first end cap of the main filter cartridge to a location surrounded by air filtration media of the main filter cartridge;
(iii) the first end cap of the main air filter cartridge having a central aperture therethrough; and,
(iv) a radially inwardly directed housing seal positioned on the first end cap of the main filter cartridge;
(v) the safety air filter element being separable from the main filter cartridge and being sized and shaped to project into the media open interior of the main filter cartridge with a portion of the end cap on the second end of the air filtration media of the safety air filter element surrounding a portion of the second end cap, of the main filter cartridge, that projects toward the first end cap of the main filter cartridge.

3. A combination according to claim 2 wherein:
(a) the second end cap of the main air filter cartridge is closed and includes an axially outwardly directed recess on an inner surface thereof.

4. An air cleaner assembly comprising:
(a) an air cleaner housing defining an interior;
(b) a safety liner positioned in the air cleaner housing;
(i) the safety liner having an end adjacent the air flow outlet and an opposite end remote from the air flow outlet;
(c) a safety air filter element removably positioned on the safety liner; the safety air filter element comprising:
(i) air filtration media structure surrounding an open filter interior and having first and second media ends;
(A) an end cap at the second media end of the air filtration media of the safety air filter element; the end cap at the second end of the safety air filter media having a portion molded to the media; the end cap also including a portion projecting across the open filter interior, from the media, to a location surrounding an aperture therethrough; and,
(B) the safety filter element being positioned over the safety liner: with the second end of the safety filter element projecting to a location remote from the air flow outlet; and, with a portion of the end of the safety liner, remote from the air flow outlet, projecting through the aperture in the portion of the end cap at the second end of the media of the safety air filter element.

5. An air cleaner assembly according to claim 4 including:
(a) a main air filter cartridge removably positioned over the safety air filter element.

6. An air cleaner assembly according to claim 5 wherein:
(a) the main air filter cartridge includes a closed end cap having an axially outwardly directed recess on an inner surface thereof.

7. An air cleaner assembly according to claim 4 including:
(a) a main air filter cartridge removably positioned over the safety air filter element and over the safety liner, the main air filter cartridge comprising:
(i) first and second, opposite, end caps;
(ii) media surrounding an open filter interior and positioned in extension between the first and second end caps;
(iii) the first end cap of the main air filter cartridge having an aperture therethrough and including a radially inwardly directed housing radial seal thereon; the housing radial seal being releasably sealed to the housing; and,
(iv) the second end cap of the main air filter cartridge being a closed end cap and having a portion thereon directed toward the first end cap of the main air filter cartridge to a location surrounding a portion of the safety liner.

* * * * *